US009096698B2

(12) United States Patent
Frost et al.

(10) Patent No.: US 9,096,698 B2
(45) Date of Patent: *Aug. 4, 2015

(54) STYRENIC RESIN INCORPORATING RECYCLED POLYSTYRENE

(71) Applicant: AMERICAS STYRENICS LLC, The Woodlands, TX (US)

(72) Inventors: Jack M. Frost, Parkersburg, WV (US); Jason R. Vititoe, Ashland, KY (US); Nicole B. Loontjens, Coventry, RI (US); Gary C. Welsh, Cincinnati, OH (US)

(73) Assignee: Americas Styrenics, LLC, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/108,210

(22) Filed: Dec. 16, 2013

(65) Prior Publication Data

US 2014/0107307 A1   Apr. 17, 2014

Related U.S. Application Data

(63) Continuation-in-part of application No. 13/571,152, filed on Aug. 9, 2012, now Pat. No. 8,609,778.

(51) Int. Cl.
*C08F 12/08*   (2006.01)
*C08L 25/06*   (2006.01)

(52) U.S. Cl.
CPC ........ *C08F 12/08* (2013.01); *C08L 25/06* (2013.01)

(58) Field of Classification Search
CPC ........ C08F 12/08; C08F 297/00; C08L 25/06; C08L 25/02; C08L 51/003; C08L 2205/02; C08L 2207/20
USPC ............................ 526/346; 525/241; 523/129
See application file for complete search history.

(56) References Cited

U.S. PATENT DOCUMENTS

| | | |
|---|---|---|
| 3,144,420 A | 8/1964 | Fryling |
| 3,563,870 A | 2/1971 | Tung et al. |
| 3,563,879 A | 2/1971 | Richards |
| 4,052,358 A | 10/1977 | Wada et al. |
| 4,136,142 A | 1/1979 | Hargreaves et al. |
| 4,263,420 A | 4/1981 | Bracke |
| 4,404,300 A | 9/1983 | Koski et al. |
| 4,525,257 A | 6/1985 | Kurtz et al. |
| 4,585,825 A | 4/1986 | Wesselmann |
| 4,668,725 A | 5/1987 | Broussard et al. |
| 4,742,741 A | 5/1988 | Hallberg et al. |
| 4,857,587 A | 8/1989 | Sosa et al. |
| 4,927,690 A | 5/1990 | Welsh |
| 4,952,627 A | 8/1990 | Morita et al. |
| 5,060,870 A | 10/1991 | Trezek et al. |
| 5,104,903 A | 4/1992 | Hahn et al. |
| 5,116,881 A | 5/1992 | Park et al. |
| 5,180,751 A | 1/1993 | Park et al. |
| 5,191,040 A | 3/1993 | Okumura et al. |
| 5,197,678 A | 3/1993 | Trezek et al. |
| 5,250,577 A | 10/1993 | Welsh |
| 5,256,732 A | 10/1993 | Morita et al. |
| 5,266,605 A | 11/1993 | Welsh |
| 5,269,948 A | 12/1993 | Krutchen |
| 5,318,965 A | 6/1994 | Chu et al. |
| 5,340,844 A | 8/1994 | Welsh et al. |
| 5,428,106 A | 6/1995 | Schrader et al. |
| 5,502,263 A | 3/1996 | Ponsford et al. |
| 5,629,076 A | 3/1997 | Fukasawa et al. |
| 5,763,551 A | 6/1998 | Wunsch et al. |
| 5,824,709 A | 10/1998 | Suka |
| 6,031,142 A | 2/2000 | Ponsford et al. |
| 6,054,540 A | 4/2000 | Chaudhary et al. |
| 6,093,781 A | 7/2000 | Demirors et al. |
| 6,117,918 A | 9/2000 | Chaudhary et al. |
| 6,169,121 B1 | 1/2001 | Noguchi et al. |
| 6,355,754 B1 | 3/2002 | Olson et al. |
| 6,355,757 B2 | 3/2002 | Garcia-Franco et al. |
| 6,362,270 B1 | 3/2002 | Chaudhary et al. |
| 6,391,998 B1 | 5/2002 | Garcia-Franco et al. |
| 6,414,047 B1 | 7/2002 | Abe |
| 6,500,872 B1 | 12/2002 | Noguchi et al. |
| 6,544,450 B2 | 4/2003 | Welsh et al. |
| 6,545,090 B1 | 4/2003 | Demirors et al. |
| 6,716,914 B2 | 4/2004 | Malzitz et al. |
| 6,794,419 B2 | 9/2004 | Suzuki |
| 7,781,552 B2 | 8/2010 | Ebara |
| 7,947,749 B2 | 5/2011 | Hasegawa et al. |
| 7,964,675 B2 | 6/2011 | Ko et al. |
| 8,242,212 B2 | 8/2012 | Grossetete et al. |
| 8,609,778 B1 * | 12/2013 | Frost et al. .................... 525/241 |

(Continued)

FOREIGN PATENT DOCUMENTS

| | | |
|---|---|---|
| CA | 912199 | 10/1972 |
| CN | 1036211 | 10/1989 |

(Continued)

OTHER PUBLICATIONS

Cazes, "A Question of Molecular Weight," Waters Associates, taken from the internet on Apr. 24, 2013.

(Continued)

*Primary Examiner* — Nathan M. Nutter

(74) *Attorney, Agent, or Firm* — Fletcher Yoder, P.C.

(57) ABSTRACT

The present disclosure provides a styrenic resin incorporating post-consumer recycle polystyrene (PCR PS), and systems and methods for making the same. For example, a styrenic resin produced in accordance with present embodiments between approximately 1 weight percent and 9 weight percent PCR PS, has a melt flow rate (MFR) of less than approximately 2.0 g/10 min per ASTM D-1238-10, and an Mz+1 molecular weight of at least 700,000. The styrenic resin is produced by a free-radical polymerization process performed on a feed having PCR PS dissolved in monovinylarene monomer. The feed is produced in such a way so as to continuously remove contaminants commonly associated with PCR PS.

20 Claims, 5 Drawing Sheets

(56) References Cited

U.S. PATENT DOCUMENTS

| | | |
|---|---|---|
| 2002/0006975 A1 | 1/2002 | Welsh et al. |
| 2002/0103267 A1 | 8/2002 | Suzuki |
| 2004/0014827 A1 | 1/2004 | Suzuki |
| 2004/0157968 A1 | 8/2004 | Marston et al. |
| 2005/0027555 A1 | 2/2005 | Forrest et al. |
| 2005/0101735 A1 | 5/2005 | Marston et al. |
| 2005/0150919 A1 | 7/2005 | Jevens et al. |
| 2005/0161858 A1 | 7/2005 | Chevillard et al. |
| 2006/0106121 A1 | 5/2006 | Seki et al. |
| 2006/0199873 A1 | 9/2006 | Mahta et al. |
| 2009/0098357 A1 | 4/2009 | Bergtold et al. |
| 2009/0143537 A1 | 6/2009 | Schneider et al. |
| 2010/0227987 A1 | 9/2010 | Ito et al. |
| 2011/0245428 A1 | 10/2011 | Grossetete et al. |
| 2012/0053255 A1 | 3/2012 | Koerner et al. |

FOREIGN PATENT DOCUMENTS

| | | |
|---|---|---|
| CN | 1625581 | 6/2005 |
| DE | 202005020234 | 3/2006 |
| EP | 0460497 | 12/1991 |
| EP | 2399719 | 12/2011 |
| GB | 2074591 | 11/1981 |
| JP | 2002121316 | 4/2002 |
| JP | 2002265663 | 9/2002 |
| JP | 2004142235 | 5/2004 |
| KR | 0139068 | 5/1998 |
| KR | 20000011874 | 2/2000 |
| KR | 20030069008 | 8/2003 |
| KR | 20030076043 | 9/2003 |
| KR | 20090028749 | 3/2009 |
| KR | 20100079682 | 7/2010 |
| KR | 20100134489 | 12/2010 |
| TW | 539736 | 7/2003 |
| TW | M258970 | 3/2005 |
| WO | WO0029470 | 5/2000 |
| WO | WO03011956 | 2/2003 |
| WO | WO03094064 | 11/2003 |
| WO | WO2009064452 | 5/2009 |

OTHER PUBLICATIONS

International Search Report for International Application No. PCT/US2013/054372 dated Nov. 4, 2013.

Moore, E.R. "Styrene Polymers." Encyclopedia of Polymer Science and Engineering vol. 16, pp. 21-58, 193-205, 230-240. John Wiley & Sons, Inc. 2nd ed. 1989.

* cited by examiner

STYRENIC RESIN INCORPORATING RECYCLED POLYSTYRENE

CROSS-REFERENCE TO RELATED APPLICATIONS

This application is a continuation-in-part of U.S. patent application Ser. No. 13/571,152 entitled "STYRENIC RESIN INCORPORATING RECYCLED POLYSTYRENE," filed on Aug. 9, 2013, now U.S. Pat. No. 8,609,778, which is hereby incorporated by reference in its entirety for all purposes.

BACKGROUND

The present disclosure relates generally to the field of polymerization and, more specifically, to polystyrene resins.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

As technologies for producing polymeric materials from simple molecular building blocks (i.e. monomers) have advanced, the products of such techniques, such as plastic goods, have become increasingly prevalent in society. One general class of polymeric materials that has seen widespread use is polystyrene. Because of the number of ways in which it may be processed, polystyrene can take a wide variety of forms and, therefore, is found in a wide variety of markets ranging from food contact applications to electronics. General purpose polystyrene (GPPS), for example, is used in a number of every day products such as jewel cases for electronic storage media (e.g. compact discs, digital video discs), housings for electronic components, laboratory equipment, appliances, toys, food containers, disposable cutlery, foams used in coffee cups and packing materials, and so on.

Due to such widespread use, many millions of tons of polystyrene are produced each year in order to manufacture these and other polystyrene-based products. In the interest of environmental stewardship, it would therefore be advantageous if at least a portion of these polystyrene-based products could be recycled. One general source of polystyrene that could potentially be recycled can be obtained from articles of manufacture used by consumers, also known as post consumer recycled (PCR) material. Unfortunately, a number of variables affect the feasibility of using post consumer material as a recycled material source for polystyrene.

For example, forming a new article partially or entirely from PCR polystyrene is generally very difficult. This difficulty mostly arises from poor processability, which is typically a result of the low molecular weights associated with PCR polystyrene resins compared to virgin polystyrene resins (e.g. resins that have not yet been formed into an article). Because of this low molecular weight, articles formed using PCR polystyrene generally also have relatively poor performance (e.g. strength) and poor appearance (e.g. clarity, color).

Processability, performance, and appearance may also be negatively affected by the presence of other materials often associated with polystyrene-based products. For example, polystyrene-based food containers, beverage containers, and/or disposable utensils may contain residual food. Coat hangers, electronic devices such as computers and household appliances, and electronic housings may include metals and/or other polymeric materials. Other polymeric materials commonly associated with used polystyrene-based articles can include polyethylene, polypropylene, polycarbonate, polybutadiene, polyacrylonitrile, and the like, which can all negatively affect the properties of a polystyrene resin.

Unfortunately, the presence of any one or a combination of these materials, and the poor processability, performance, and appearance generally associated with PCR polystyrene can be a significant hindrance to recycling polystyrene products. Accordingly, a need exists for systems and methods for producing a high quality stream of PCR polystyrene, as well as systems and methods for recycling PCR polystyrene into a resin having processability, performance, and appearance suitable for the production of articles of manufacture.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates generally to the recycling of styrenic materials that have been used in consumer products and subsequently returned to a manufacturer for re-use. Such materials, defined herein as "post-consumer recycle polystyrene" (PCR PS), are incorporated into a styrenic feed including the PCR PS dissolved within monovinylarene monomer. As discussed in detail below, a PCR PS feed preparation system including a number of subsystems for receiving, dissolving, and generally cleaning/treating (e.g., filtering) the styrenic feed is provided. Polymerizing the monovinylarene monomer in the feed may produce a post-consumer containing (PCC) styrenic resin. Indeed, as defined herein, a "post-consumer containing" (PCC) styrenic resin is intended to denote a newly produced resin incorporating PCR PS and virgin styrenic polymer.

By producing a resin in this manner, the virgin styrenic resin produced by the polymerization and the PCR PS may become intimately mixed, such that the virgin styrenic material is able to substantially offset the relatively poor properties of the PCR PS. A resin produced in accordance with present embodiments may have, generally, between 1 weight percent and 50 weight percent PCR PS, such as between approximately 1 weight percent and 30 weight percent. In some embodiments, a resin produced in accordance with present embodiments may have less than 10 weight percent but more than 1 weight percent PCR PS, for example between approximately 1 weight percent and 9 weight percent, between approximately 2 weight percent and 8 weight percent PCR PS, between approximately 3 weight percent and 7 weight percent PCR PS, or between approximately 4 weight percent and 6 weight percent PCR PS. Alternatively, the styrenic resin may include at least approximately 10 weight percent and 40 weight percent PCR PS, such as between approximately 20 weight percent and 30 weight percent PCR PS, between approximately 20 weight percent and 26 weight percent PCR PS, or approximately 25 weight percent PCR PS.

The virgin material and control of the polymerization reaction may be sufficient so as to produce the post-consumer styrenic resin with the desired processability and performance, characterized by melt flow rate (MFR), Z+1 molecular weight (Mz+1), and/or extensional viscosity (EV), which may all be characteristic of processability and performance.

Generally, the MFR of the post-consumer styrenic resin will be below 4.0 g/10 min per ASTM D-1238-10, such as 2.5 g/10 min or less per ASTM D-1238-10, or less than 2.0 g/10 min per ASTM D-1238-10. The Mz+1 of the post-consumer styrenic resin may be at least approximately 685,000 atomic mass units (a.m.u.), such as between approximately 680,000 and 750,000 a.m.u. Further, the EV of the post-consumer styrenic resin will generally be at least 250,000 Pascal-seconds (Pa-sec), such as between approximately 285,000 Pa-sec and 350,000 Pa-sec, or between approximately 300,000 Pa-sec and 340,000 Pa-sec.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
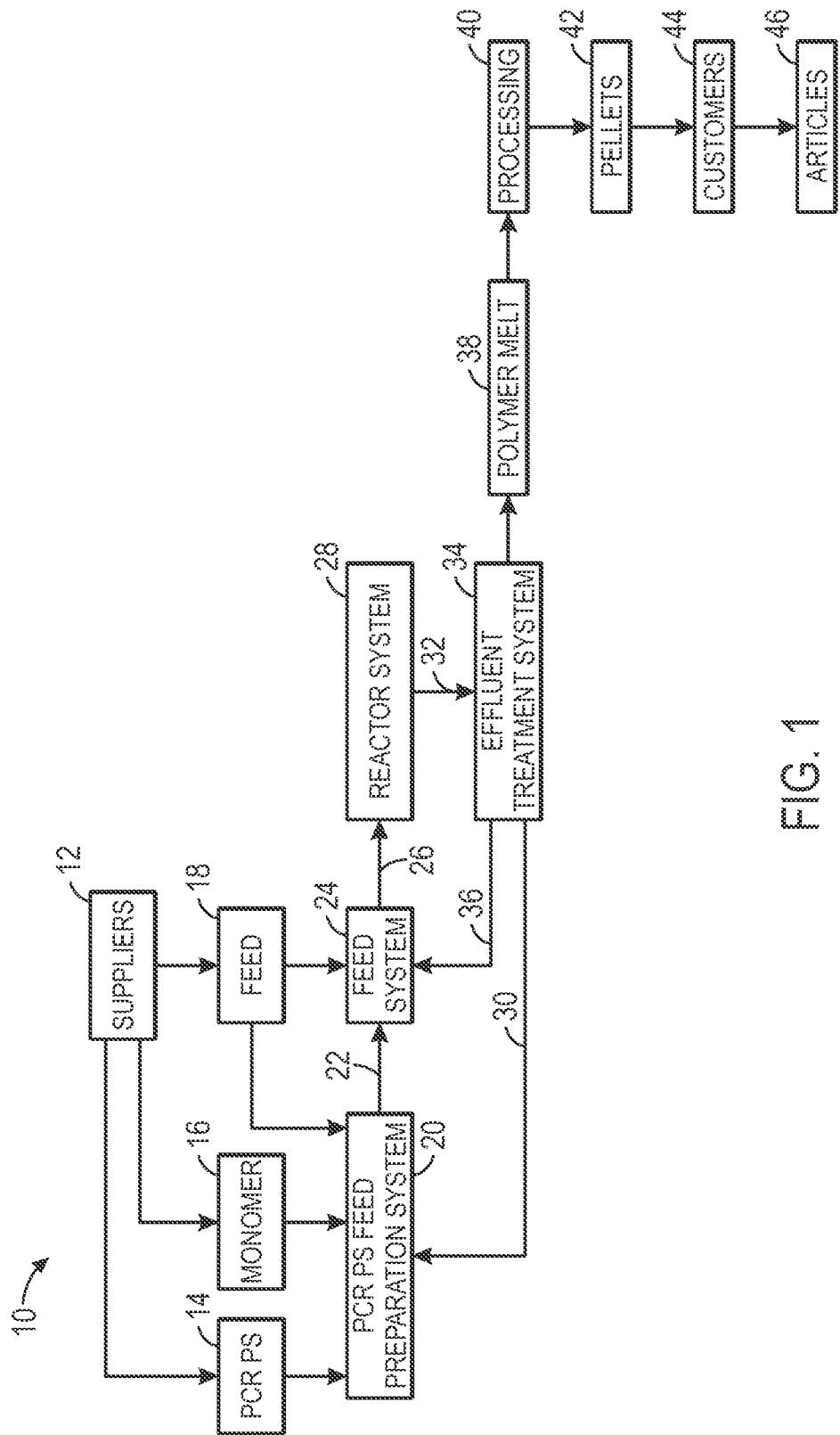
FIG. 1 is a block diagram of one embodiment of a system configured to produce a post-consumer containing styrenic resin from post-consumer recycled polystyrene obtained from one or more sources, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As noted above, difficulties associated with recycling polystyrene products can include the presence of contaminants (e.g., particulates, non-styrenic polymers, food waste, metals) and prior processing (e.g., heat history, shear) associated with the used polystyrene. These factors can result in poor processability and poor physical properties if the PCR PS is not treated.

Processing, which generally involves exposing a resin to high heat and shear (e.g., during extrusion), can result in chain scission in the polymeric chains of a given resin, effectively reducing the average molecular weight and, therefore, the subsequent processability and performance of the resin. Each cycle of high heat may generally be referred to as a heat history, and is typically associated with a cycle in which the resin is exposed to high shear. Incidentally, each heat history of a resin results in a reduction in the processability, performance, and appearance of the resin.

In view of these factors, it is now recognized that it may be desirable to treat used streams of polystyrene material in a manner that enables the used stream of polystyrene material to be incorporated in a newly produced styrenic resin. For example, it is now recognized that it may be desirable to remove contaminants from the used polystyrene (i.e., a PCR PS) so as to enable its incorporation into a polymerization process configured to produce a virgin styrenic resin. Systems and methods enabling the production of such a stream of PCR PS are discussed in detail below with respect to FIGS. 2-4.

In addition, it is also now recognized that it may be desirable to enhance the processability, performance, and appearance of a resin incorporating PCR PS (i.e., a PCC styrenic resin) by incorporating the PCR PS, along with virgin polystyrene, into a new resin having enhanced processability and performance compared to PCR PS alone. For example, in accordance with certain embodiments, PCR PS that is treated using the systems and methods discussed with respect to FIGS. 2-4 may be incorporated as a feed component into a polymerization system configured to produce a virgin polystyrene. Accordingly, the resin produced according to such embodiments may include PCR PS along with the virgin polystyrene produced in the system. The virgin polystyrene produced within the system may, in some embodiments, have enhanced characteristics so as to at least partially offset the negative effects of the PCR PS on processability and performance.

Further, it is now recognized that producing such a resin "in-reactor" (i.e., incorporating the PCR PS into a reactor that then produces a styrenic resin) may produce a styrenic resin having improved properties compared to a resin produced by compounding the PCR PS with a virgin polystyrene resin. Indeed, using the approaches described herein, the present embodiments enable the production of a styrenic resin having at least 5 percent by weight (wt %) PCR PS, such as between approximately 5 and 50 wt %, 15 and 40 wt %, 20 and 30 wt %, or about 25 wt % PCR PS. The styrenic resin so produced may have processability and performance suitable for the production of articles of manufacture. Systems and methods for producing such resins are discussed in detail below.

I. Styrenic Resin Production Process—An Overview

In the production of styrenic resins, polymerization reactors, which polymerize monovinylarene monomers into polymers, and processing equipment (e.g., extruders), may undergo continuous or batchwise operation. FIG. 1 depicts a block diagram of an example system for producing styrenic resins (e.g., general purpose polystyrene (GPPS), high impact polystyrene (HIPS)) incorporating PCR PS. Various suppliers 12 may provide reactor feedstocks to the system 10 via railcars, pipelines, trucks, cylinders, drums, and so forth. The suppliers 12 may include off-site and/or on-site facilities, including plants, refineries, initiator plants, and the like. Examples of possible feedstocks include post-consumer recycle polystyrene (PCR PS) 14 and monovinylarene (MVA) monomers 16. Other feeds 18 provided by the suppliers 12 may include any one, or a combination of: comonomers (such as olefins and/or conjugated dienes), diluents (such as saturated, unsaturated, and aromatic hydrocarbons), chain transfer agents, coupling agents, initiators (such as free-radical initiators or anionic initiators), impact enhancement agents, plasticizers and other additives such as colorants, release agents, antiblock agents and other processing aids, and flame retardants. In one embodiment, the feed 18 may include either a HIPS-producing feed (e.g., synthetic rubber such as polybutadiene dissolved within MVA monomer), or an actual HIPS feed (e.g., a HIPS resin that is dissolvable/suspendable in the MVA monomer).

As set forth above "post-consumer recycle polystyrene" (PCR PS) is intended to denote a styrenic resin that has been manufactured and then used by the public consumer and returned to a manufacturer or producer. Thus, "PCR PS," as used herein, refers to a styrenic resin (e.g., GPPS, HIPS), obtained as a raw or processed styrenic material that has been previously incorporated into one or more consumer products, used by the consumer, and returned to a manufacturer/producer. The PCR PS may therefore consist entirely or essentially of styrenic polymers (e.g., HIPS and/or GPPS resins) or may include styrenic polymers and other materials that affect the properties (e.g., appearance, performance, processability) of the styrenic material. As noted above, the other materials may include consumer waste, metallic objects (e.g., conductors, wire hangers), and other polymeric materials commonly associated with polystyrene in consumer products. By way of non-limiting example, such other polymeric materials may include any one or a combination of polyolefins (e.g., polyethylene, polypropylene), polyacrylates (e.g., polyacrylonitrile), polyconjugated dienes (e.g., polybutadiene), polyvinyl halides (e.g., polyvinylchloride) and the like. Other polymers and materials typically associated with styrenic polymers in consumer products will be readily apparent to those of ordinary skill in the art and are within the scope of the present disclosure. While any source of PCR PS is presently contemplated, in certain embodiments, it may be desirable to utilize a source of PCR PS that has had limited to no contact with materials that may be undesirable for subsequent food contact applications, such as beverage containers, food trays, and the like. One example source of PCR PS is NEXTLIFE RECYCLING SUSTAINABLE POLYSTYRENE® PCR PS, which is commercially available from NextLife Recycling, LLC of Boca Raton, Fla.

"Monovinylarene monomer," or "MVA monomer," as used herein, refers to an organic component containing a single carbon-carbon double bond and at least one aromatic moiety. By way of non-limiting example, the MVA monomer may include a total of 8 to 18 carbon atoms, such as 8 to 12 carbon atoms. Example monovinylarenes include, but are not limited to, alkyl-substituted styrenes such as α-alkylstyrenes (for example, α-methylstyrene and α-ethylstyrene), ring-substituted styrenes (for example, 2,4-dimethylstyrene; o-ethylstyrene, t-butyl-styrene, vinyltoluene and particularly p-vinyltoluene, ring-substituted halostyrenes such as chlorostyrene and 2,4-dichlorostyrene, styrene substituted with both a halo and alkyl group, such as 2-chloro-4-methylstyrene, vinyl anthracene, and mixtures thereof. In one embodiment, the monovinylarene is styrene.

The PCR PS 14, MVA monomer 16, and a portion of the feed 18 (e.g., diluent, a styrene/polybutadiene mixture) may be provided to a PCR PS feed preparation system 20 that is configured to produce a PCR PS feed 22. The PCR PS feed 22 may include treated PCR PS in MVA monomer and may, in certain embodiments, include feed components to produce a HIPS resin, such as synthetic rubber dissolved in MVA monomer. To produce the PCR PS feed 22, as discussed in detail below with respect to FIGS. 2-4, the PCR PS feed preparation system 20 receives at least the PCR PS 14 and the MVA monomer 16 and conditions a mixture produced therefrom such that the PCR PS feed 22 is suitable for introduction into a feed system 24 that supplies a reactor feed 26 to a reactor system 28. Generally, the PCR PS feed preparation system 20 may include slurry tanks, feed hoppers, dissolvers, strainers, filters (e.g., bag filters, self-cleaning filters), pumps, flow control valves, surge tanks, holding tanks, and the like in any configuration suitable for receiving the PCR PS 14 and MVA monomer 16, producing a dissolved solution therefrom, filtering the dissolved solution to remove contaminants, and for storing the PCR PS feed 22 for eventual provision to the feed system 24 and/or the reactor system 28.

Before use, the PCR PS 14, MVA monomer 16, and any components of the feed 18 that are used to produce the PCR PS feed 22 (e.g., a styrene/synthetic rubber mixture for HIPS production) may, in some embodiments, be stored in feed tanks, diluent vessels, and/or sent through treatment beds to remove certain components (e.g., oxygen, water). Furthermore, in operation, the PCR PS feed preparation system 20 may also store, treat, and meter a portion of diluent and/or unreacted monomer 30 recovered from reactor effluent 32 by an effluent treatment system 34 for recycle to the reactor system 28. It should be noted that while the feed system 24 is illustrated as receiving the PCR PS feed 22 prior to its introduction into the reactor system 28, in other embodiments the PCR PS feed 22 may be provided directly from the PCR PS feed preparation system 20 to the reactor system 28.

In addition to, or in lieu of receiving the PCR PS feed 22, the feed system 24 may also receive and prepare components of the feed 18 for introduction into the reactor system 28. For example, an initiator may be mixed with diluent (e.g., ethylbenzene) or mineral oil in initiator preparation tanks. In embodiments where the resin produced by the system 10 incorporates a HIPS resin, the feed system 24 may also receive a feed of synthetic rubber dissolved/suspended in a monovinylarene monomer, or may separately receive the polybutadiene and monovinylarene monomer to produce such a solution. The feed system 24 may also receive in-system recycled components 36 recovered from the effluent treatment system 34 such as diluent and other unused components of the feed 18. In total, the feed 18 and recovered reactor effluent are processed in the feed system 24 and fed as the reactor feed 26 (e.g., the PCR PS feed 22, MVA monomer, comonomer, diluent, initiators, additives, or combinations thereof) to the reactor system 28. Further, the feed system 24 typically provides for metering and controlling the addition rate of the reactor feed 26 into the reactor system 28 such that, along with reactor system configuration (e.g., operational parameters), desired reactor stability and/or desired styrenic resin properties or production rate are obtained/maintained.

The reactor system 28 may have one or more reactors each having one or more reaction vessels or zones. For example, the reactor system 28 may include one or more reaction vessels operating in a series configuration, parallel configuration, or any suitable configuration. By way of non-limiting example, the reactors of the reactor system 28 may be continuous stirred tank reactors (CSTR), stirred tower reactors, axially segregated horizontal reactors, pipe reactors, and the like. In the reactor vessels or zones, the MVA monomer 16 is polymerized according to a free-radical bulk or solution polymerization process. For example, as discussed in further detail below, the polymerization may be conducted in the presence of an initiator, which may be a peroxide-based or an azo-based initiator.

The polymerization process conducted within the reactor system 28 produces a product containing polymer particulates, typically referred to as polymer melt or granules. The melt may possess one or more melt, physical, rheological, and/or mechanical properties of interest, such as density, melt flow rate (MFR), extensional viscosity (EV), copolymer or comonomer content, modulus, color, clarity, and crystallinity. The reaction conditions, such as the particular materials selected for the reaction, temperature, pressure, flow rate, mechanical agitation, product takeoff, component concentrations, polymer production rate, and so forth, may be selected to achieve a desired range of properties.

The effluent 32 from the reactors within the reactor system 28 may include the polymer melt as well as non-polymer components, such as diluent, unreacted monomer/comonomer and residual additives. After leaving the reactor system 28, the effluent 32 may be subsequently processed, such as by the effluent treatment system 34, to separate non-polymer components such as the diluent and/or unreacted monomer 30 or other recycled components 36 from styrenic polymer melt 38. In accordance with the present disclosure, the styrenic polymer melt 38 is generally a post-consumer containing (PCC) styrenic resin, which is a styrenic resin containing both virgin and PCR styrenic materials. To separate the melt 38 from certain other materials, the effluent treatment system 34 may include various devolatilizers, flashline heaters, flash vessels, and so on, which are configured to remove certain compounds (e.g., unreacted monomer and diluent) from the melt 38.

The recovered non-polymer components may be processed, such as by a fractionation system within the effluent treatment system 34, to separate unreacted monomer and/or diluent from other components not typically associated with the feed 18. The recycled components 36 may then be returned to the reactor system 28 via the feed system 24.

The styrenic polymer melt 38 may be further processed within a processing system 40 (e.g., an extrusion/loadout system). In the processing system 40, in one embodiment, the styrenic polymer melt 38 is typically extruded through a die, cooled, and then pelletized to produce polymer pellets 42 with the desired mechanical, physical, and melt characteristics. In another embodiment, the styrenic polymer melt 38 is extruded into a cutting chamber, and is cooled in a water system disposed at or near the discharge of the pelletizer/cutter. Extruder feed may contain additives, such as UV inhibitors, antioxidants, colorants, processing aids, flame retardants, and so forth, which are added to the styrenic polymer melt 38 to impart desired characteristics to the extruded styrenic polymer pellets 42. Thus, "pellet," as used herein, is intended to denote a physical form of a resin that formed by extruding, cooling, and cutting the resin.

In general, the styrenic polymer pellets 42 may then be transported to a product load-out area where the pellets may be stored, blended with other pellets, and/or loaded into railcars, trucks, bags, and so forth, for distribution to customers 44. The customers 44 may utilize the styrenic polymer pellets 42 to form various articles 46. For example, the styrenic polymer pellets 42 can be used to make telephones, house wares, refrigerator parts, lawn and garden tools, kitchen appliances, electronics housings, toys, window pieces, packaging articles, food packaging and food service articles, beverage containers, medical parts or devices, foam insulation, foam beverage containers, foam coolers, and the like. Indeed, any number of processes may be performed on the pellets 42 to produce the articles 46, including foam sheet extrusion, foam board extrusion, extrusion and thermoforming, injection molding, and similar processes.

For example, forming the article 46 may include producing a foaming mixture. The foaming mixture may include at least the styrenic resin and a blowing agent, and is heated and/or subjected to a reduced pressure to release the blowing agent to produce a foamed styrenic resin. The foamed styrenic resin may be subsequently extruded into a sheet and thermoformed to produce the article 46, or may be extruded into a board (typically thicker than a sheet) and used as foam insulation or the like. Another process may include expanding the pellets 42 (e.g., with air, steam, or another gas) and molding the resulting expanded resin to produce the article 46.

In still other processes, the pellets 42 may be extruded to produce a film or sheet. The extruded film or sheet may be blown or cast to produce a blown or cast film, which may then be rolled or thermoformed to produce a shaped article. The shaped article, in some embodiments may be trimmed to produce the article 46. In certain embodiments, the PCC styrenic resin may have properties so as to enable the trimmings from such a process to be re-ground, re-extruded, and subsequently incorporated into an article. In still other embodiments, a polymer melt may be produced from the pellets 42, and the melt may be injection molded to produce the article 46.

As noted above, the PCR PS feed preparation system 20 is configured to produce the PCR PS feed 22 in a manner suitable for subsequent polymerization and production of the PCC styrenic resin pellets and resulting products discussed above. In other words, the PCR PS feed 22 may be produced in such a way so as to enable its use within the reactor system 28. Accordingly, the PCR PS feed 22 provided to the feed system 24 and/or the reactor system 28 may be substantially free of components that would otherwise deleteriously affect the free-radical polymerization process and properties of the resulting product. For example, the PCR PS feed 22 may be substantially free of oxygen, metallic components, consumer waste, non-styrenic resins, and the like. The PCR PS feed preparation system 20 includes a number of subsystems discussed below with respect to FIGS. 2-4 that enable the production of the PCR PS feed 22 in this manner.

II. Preparation of the Post-Consumer Recycle Polystyrene Feed

Figure 2:
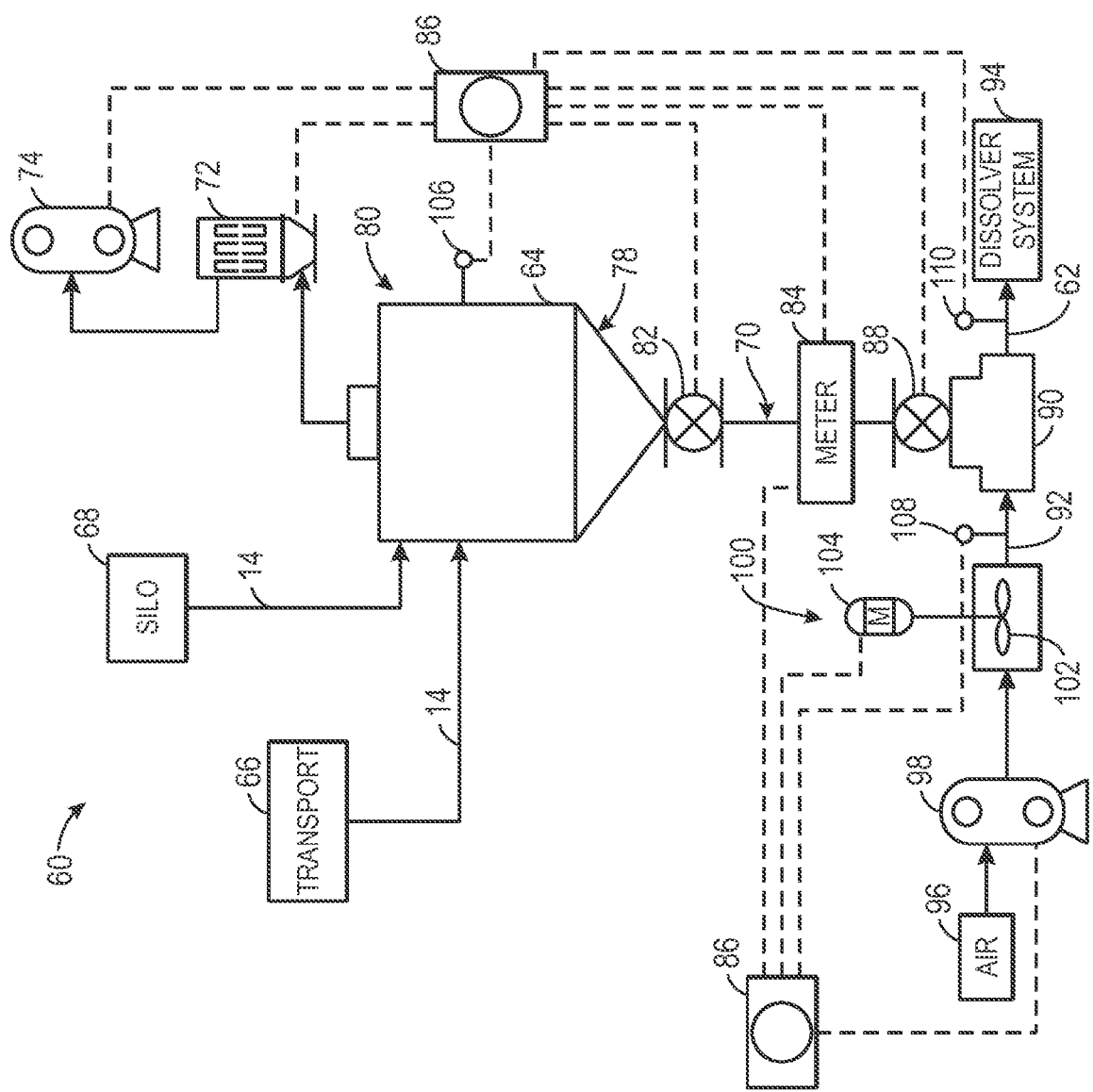
FIG. 2 is a diagrammatical illustration of an embodiment of a receiving system of the PCR PS feed preparation system of FIG. 1, the receiving system being configured to receive the PCR PS and convey the PCR PS in a controlled manner to a dissolver system of the PCR PS feed preparation system, in accordance with an aspect of the present disclosure.

One subsystem of the PCR PS feed preparation system 20, which is diagrammatically depicted in FIG. 2, is a receiving system 60. The receiving system 60 is configured to receive the PCR PS 14 (e.g., from one of the suppliers 12) and to prepare a pneumatically transported stream of PCR PS 62 for further treatment in the PCR PS feed preparation system 20. The receiving system 60 includes a feed hopper 64 configured to collect the PCR PS 14 from one or more sources (e.g., a transport vehicle 66, a silo 68) and to introduce the PCR PS 14 into flow path 70 of the PCR PS feed preparation system 20. The feed hopper 64 is generally configured to receive the PCR PS 14 in any form, such as flake or pellets, or a mixture thereof. In certain embodiments, it may be desirable for the PCR PS 14 to be in flake form for ease of conveyance, better dissolution rates, and more efficient filtration, as discussed with respect to FIGS. 2-4 below. "Flake," as used herein, is intended to denote a physical form of a resin produced by mechanically grinding the resin. Thus, in accordance with the present disclosure, flakes may include chips, granules, and other similar forms of a resin.

In the illustrated embodiment, the feed hopper 64 is fluidly coupled to or includes a first cyclone separator 72 and a vacuum blower 74. As the vacuum blower 74 pulls an exhaust flow (e.g., air, dust, debris) from the feed hopper 64, the first cyclone separator 72 removes particulates (e.g., dust, debris) from the exhaust flow and enables the air in the exhaust to be vented into the atmosphere. The cyclone separator 72 may also prevent PCR PS particulates from reaching the vacuum blower 74. The vacuum blower 74 and/or first cyclone separator 72 may be operated in a continuous or intermittent fashion until the feed hopper 64 is filled with a desired amount of PCR PS 14.

During operation, the PCR PS 14 collects and fills the feed hopper 64 from a bottom region 78 to a top region 80. While the top region 80 is generally coupled to the vacuum blower 74 and the first cyclone separator 72, the bottom region 78 is coupled to a first rotary valve 82 to enable the PCR PS 14 to controllably exit the feed hopper 64. In some embodiments, there may be one, two, three, four or more rotary valves operating independently or substantially in unison.

A meter 84 may be disposed along the flow path 70 for monitoring and/or metering the amount of PCR PS 14 that has been provided into the flow path 70. For example, the meter 84 may be a rotary weigh meter, a pressure meter, a flow meter, or any other meter suitable for measuring or providing feedback indicative of the amount of PCR PS 14 provided into the flow path 70. In certain embodiments, the measurements or feedback may be used as input for adjustments to the first rotary valve 82. For example, the measurements and/or feedback may be provided to a controller communicatively coupled to the meter 84, such as a distributed control system (DCS) 86 configured to control operational parameters of at least some elements of the PCR PS feed preparation system 20.

In certain embodiments, the meter 84 (e.g., a weigh meter) may collect a predetermined amount of PCR PS 14 (e.g., a predetermined weight) such that a controlled amount of PCR PS 14 is provided to downstream equipment of the PCR PS feed preparation system 20. A second rotary valve 88 may also be disposed along the flow path 70 downstream of the meter 84. The second rotary valve 88 may control (e.g., via control signals provided from the DCS 86) a flow of the PCR PS 14 from the meter 84 and to a pickup tee 90. At the pickup tee 90, the PCR PS 14 is subjected to a flow of a conveyance gas 92 for provision to a dissolver system 94 of the PCR PS feed preparation system 20.

The conveyance gas 92 may be generated using any gaseous source (e.g., air, helium, argon, nitrogen), though it may be desirable for the conveyance gas 92 to be generated using air 96 collected from the atmosphere for cost considerations. A pressure blower 98 collects the air 96 and pressurizes it. An air cooler 100 is disposed downstream from the pressure blower 98 and upstream of the pickup tee 90. The air cooler 100 includes an impeller 102, which may be driven by a motor 104 communicatively coupled to the DCS 86. The DCS 86 is therefore capable of at least partially controlling the flow and temperature of the conveyance gas 92.

The DCS 86 may control the timing and other operational parameters of these and other elements of the PCR PS feed preparation system 20. Generally, the DCS 86 may be any processor-based device capable of performing control routines to adjust operational parameters as a result of feedback obtained from any one or a combination of elements within the entire system 10, such as the PCR PS feed preparation system 20. For example, the DCS 86 may include one or more processors configured to perform instructions stored on a tangible, machine-readable medium, the stored instructions resulting in the performance of the control routines. For example, as illustrated, the DCS 86 may be communicatively coupled to, and may control the operation of, any one or a combination of the vacuum blower 74, the first cyclone separator 72, the first and second rotary valves 82, 88, the meter 84, the pressure blower 98, and the conveying blower 100. The DCS 86 may obtain feedback indicative of the fill level in the feed hopper 64, flow rates of the conveyance gas 92, amount of PCR PS 14 measured at the meter 84, or any other such parameter, at least using a series of transducers 106, 108, 110, the meter 84, or any combination thereof. The transducers 106, 108, 110 may monitor/measure temperature, pressure, flow rates (e.g., mass flow rates), or any combination thereof.

As a result of such measurements, the DCS 86 may adjust, when appropriate, one or more operational parameters of the receiving system 60. By way of non-limiting example, the DCS 86 may open the feed hopper 64 to the flow path 70 via the first rotary valve 82 once a desired amount of PCR PS 14 has been provided to the feed hopper 64. Conversely, the DCS 86 may close the feed hopper 64 to the flow path 70 via the first rotary valve 82 once a desired amount of PCR PS 14 has been provided to the flow path 70 as measured by the meter 84. The opening and closing of the flow path 70 between the pickup tee 90 and the meter 84 via the second rotary valve 88 may also be controlled based at least in part on similar feedback. Additionally or alternatively, the DCS 86 may control the flow rate of the stream of PCR PS 62 as it is conveyed to the dissolver system 94.

It should be noted that while the DCS 86 is described below as performing adjustments to certain operational parameters, the DCS 86 may operate in conjunction with, or in lieu of, an operator. Further, any one or a combination of the control acts described herein may be performed by an operator in lieu of the DCS 86. For example, an operator may make adjustments to valve positions, power provided to certain components, and other control parameters, as a result of indications obtained from the PCR PS feed preparation system 20. By way of non-limiting example, such user-perceivable indications may include gauges, lights, readouts, displays, alarms, and so on, for providing auditory, visual, and/or tactile feedback that a change in an operational parameter may be appropriate. Accordingly, with respect to the operation of the receiving system, the DCS 86, in addition to or in lieu of an operator, may control, adjust, and/or monitor a flow of the stream of PCR PS 62 to the dissolver system 94.

Figure 3:
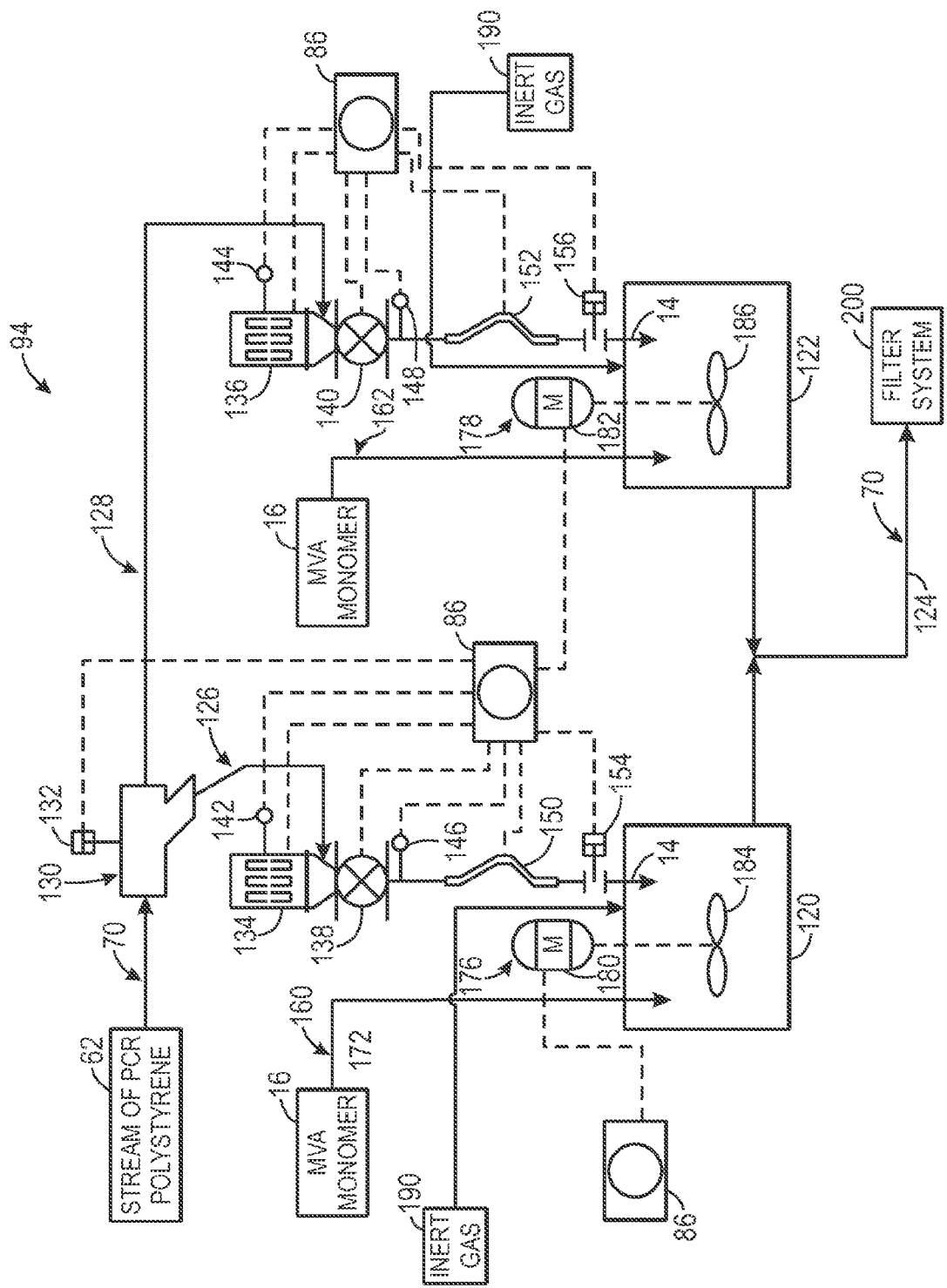
FIG. 3 is a diagrammatical illustration of an embodiment of a dissolver system of the PCR PS feed preparation system of FIG. 1, the dissolver system being configured to receive the PCR PS and a monovinylarene monomer, and to dissolve the PCR PS in the monovinylarene monomer to produce a dissolved mixture, and to convey the dissolved mixture in a controlled manner to a filter system of the PCR PS feed preparation system, in accordance with an aspect of the present disclosure.

Moving now to FIG. 3, the illustrated dissolver system 94 includes a first dissolver 120 and a second dissolver 122 for dissolving the PCR PS 14 in the MVA monomer 16 to produce a dissolved mixture 124. As noted above, it may be desirable for the PCR PS 14 to be in flake (e.g., granules, chips) form rather than other forms such as pellets, as it is now recognized that flakes may provide enhanced dissolution rates within the dissolvers. As illustrated, the first and second dissolvers 120, 122 may be configured to operate such that as one dissolver is providing the dissolved mixture 124 downstream, the other dissolver is preparing a fresh batch of the dissolved mixture 124. In this way, the dissolver system 94 may substantially continuously produce the dissolved mixture 124.

In other embodiments, one of the first or second dissolvers 120, 122 may not operate while the other is operational, such that the dissolver that is not operating may serve as a backup should any undesirable operational condition be detected in the operating dissolver. Further, the dissolver system 94 may include one or more than two (e.g., three, four, five, or more) dissolvers depending on the desired throughput of the dissolver system 94, spatial constraints, vessel sizes, equipment limitations, and so forth.

The stream of PCR PS 62, as noted above, includes at least the PCR PS 62 and the conveyance gas 92, and flows along the flow path 70 generally toward the first and second dissolvers 120, 122. In particular, as illustrated, the stream of PCR PS 62 flows along the flow path 70 and is split into a first intermediate flow path 126 toward the first dissolver 120 or a second intermediate flow path 128 toward the second dissolver 122 as determined by a diverter valve 130 having an actuator 132 communicatively coupled to the DCS 86. Thus, the stream of PCR PS 62 may be provided to either of the dissolvers 120, 122.

A number of features may be disposed along the first and second intermediate flow paths 126, 128 to feed the dissolvers 120, 122. For example, elements configured to remove certain types of contaminants (e.g., metals, dust, particulates) from the stream of PCR PS may be disposed along either flow paths 126, 128 including features for removing all or a portion of the conveyance gas 92 from the stream of PCR PS 62. For example, such features may be desirable to remove materials that may deleteriously affect the free-radical polymerization process, generate color bodies, or cause an undesirable condition in the dissolvers 120, 122.

As illustrated, the first and second intermediate flow paths 126, 128 include second and third cyclone separators 134, 136, respectively, which are each configured to aid in the removal of dust and particulates from the stream of PCR PS 62. A rotary valve 138 disposed at an exit of the second cyclone separator 134 and/or a rotary valve 140 disposed at an exit of the third cyclone separator 136 are actuated (e.g., by the DCS 86) to provide the PCR PS to the dissolvers 120, 122.

In certain embodiments, for example, the amount of PCR PS 14 collected within each of the second and third cyclone separators 134, 136 may be monitored using transducers 142, 144 disposed on and/or within each cyclone separator. Additionally or alternatively, the DCS 86 may monitor the amount of PCR PS 14 flowing along the first and second intermediate flow paths 126, 128 using transducers 146, 148 disposed downstream from the second and third cyclone separators 134, 136. The DCS 86 may make adjustments to the respective positions of rotary valves 138, 140 in order to affect the amount of PCR PS 14 provided to the first and/or second dissolvers 120, 122 as a result of such monitoring.

It should be noted that the dissolution of PCR PS 14 in the MVA monomer 16 may not necessarily be instantaneous. In addition, agglomeration of the PCR PS 14 may form a mass that may be difficult to dissolve. Agglomerated polymer masses can cause a variety of undesirable operating conditions such as plugged lines, and may damage agitators, pumps, or the like. Thus, the PCR PS 14 may be controllably provided to the dissolvers 120, 122 after a predetermined amount of MVA monomer 16 is in the dissolvers 120, 122, and in a manner that mitigates agglomeration of the PCR PS 14. Therefore, the DCS 86, an operator, or both, may monitor and/or control the flow of the PCR PS 14 into the dissolvers 120, 122 based at least on the amount of MVA monomer 16 in the dissolvers 120, 122 using the rotary valves 138, 140 and/or stop valves 154, 156. The stop valves 154, 156 enable a flow of PCR PS 14 to the first and/or second dissolvers 120, 122 to be stopped as desired. For example, the first and/or second stop valves 154, 156 may be closed during a time period in which the PCR PS is dissolving within the MVA monomer 16 (i.e., a dissolving period). After the dissolving period is over, after the resulting mixture is discharged from the first and/or second dissolvers 120, 122, and after a desired amount of MVA monomer 16 has been provided to the dissolvers 120, 122, the first and/or second stop valves 154, 156 may be re-opened to allow fresh PCR PS 14 to be charged (i.e., added) into the first and/or second dissolvers 120, 122.

The first and second flow paths 126, 128 may also include a first magnetic separator 150 and a second magnetic separator 152 for removing metallic objects from the PCR PS 14. However, it is presently contemplated that magnetic separators may be disposed anywhere in the PCR feed preparation system 20, such as between the meter 84 and valve 88 of FIG. 2. Such removal may be desirable due at least in part to the sensitivity of the polymerization reaction to metallic species, which can consume the initiator, can terminate active polymer chains (resulting in decreased molecular weights), and can also, in some situations, change polymerization rates and/or the nature of the polymers formed (e.g. branching). While any magnetic separator may be used in accordance with present embodiments, in certain configurations, the first and second magnetic separators 150, 152 may operate by allowing the PCR PS 14 to generally flow through a hollow region defined by one or more magnetically charged walls. Magnetic or magnetizable objects (e.g., particulates) may collect on the walls while non-magnetic objects may pass through the hollow regions of the first and second magnetic separators 150, 152. In certain embodiments, the first and second magnetic separators 150, 152 may, alternatively or additionally, be electrostatically charged so as to collect dust and other such small contaminants.

As noted above, MVA monomer 16 is provided, in addition to the PCR PS 14, to the first and second dissolvers 120, 122 to generate the dissolved mixture 124. While any addition sequence is presently contemplated, it may be desirable to provide the MVA monomer 16 to the dissolvers 120, 122 before charging the PCR PS 14. In particular, it may be desirable to first have a predetermined level of MVA monomer 16 in the dissolvers 120, 122 before charging the PCR PS 14 to facilitate dissolution. The MVA monomer 16 may be provided from a source such as a storage vessel, a tank, a pipeline, or the like, along first and second monomer flow paths 160, 162 to the first and second dissolvers 120, 122, respectively. In certain embodiments, the MVA monomer 16 may be treated to remove materials that can negatively impact the free-radical polymerization process carried out in the reactor system 28, the properties of the PCC styrenic resin produced by the system 10, or both.

As may be appreciated, the first and second monomer flow paths 160, 162 may have various pumps, blowers, valves, and so forth, which are configured to motivate and control a flow of the MVA monomer 16 toward the dissolvers. Generally, one or more flow control and/or stop valves may generally be configured to start, stop, or adjust the flow of the MVA monomer 16 along the first and second monomer flow paths 160, 162 so as to provide a desired amount of MVA monomer 16, at a desired rate and in desired amounts, to the first and second dissolvers 120, 122. In addition, one or more transducers (e.g. flow meters) may be positioned between the source of the MVA monomer 16 and the dissolvers 120, 122 for monitoring the flow of the MVA monomer 16.

The desired amount of MVA monomer 16 provided to the first and second dissolvers 120, 122 may be determined based at least partially on the desired concentration of PCR PS 14 within the MVA monomer 16, the capacity of the first and second dissolvers 120, 122, equipment limitations (e.g. agitators, pumps), and similar considerations. The rate at which the MVA monomer 16 is provided to the first and second dissolvers 120, 122 may also be determined based at least partially on these considerations. By way of example, the PCR PS 14 and the MVA monomer 16 may be provided to the first and second dissolvers 120, 122 in respective amounts such that the dissolved mixture 124 contains between approximately 5 and 50 weight percent PCR PS in MVA monomer, such as between approximately 15 and 35 weight percent, between approximately 20 and 30 weight percent, or approximately 25 weight percent.

To facilitate mixing and dissolution, the first and second dissolvers 120, 122 also include first and second agitators 176, 178, which are generally configured to agitate the mixture produced when the PCR PS 14 and the MVA monomer 16 are provided to the first and second dissolvers 120, 122. For example, during operation, the agitators 176, 178 may agitate the MVA monomer 16 as the PCR PS 14 is charged into the dissolvers 120, 122 to facilitate dissolution.

As illustrated, the first and second agitators 176, 178 include first and second motors 180, 182, respectively, which are coupled to first and second impellers 184, 186 disposed within an interior of the first and second dissolvers 120, 122. The DCS 86 may control either or both of the first and second motors 180, 182 to stop, start, or otherwise adjust the speed of the impellers 184, 186. In doing so, the agitation rate can be adjusted to ensure a desired agitation rate between the PCR PS 14 and the MVA monomer 16 to facilitate dissolution.

The dissolver system 94 also utilizes inert gas 190 to prevent undesirable operating conditions within the dissolvers 120, 122. The inert gas 190 may be delivered from a vessel such as a tank or canister, or from an air separation unit that produces a stream of nitrogen from atmospheric air. By way of non-limiting example, the inert gas 190 may be nitrogen, helium, argon, or the like. The flow of the inert gas 190 into the dissolvers 120, 122 may be controlled automatically by the DCS 86 and/or by an operator.

After an amount of time, the dissolved mixture 124 is produced from the PCR PS 14 and the MVA monomer 16 within the first and second dissolvers 120, 122. Indeed, after the dissolved mixture 124 is produced, it is discharged from the first and second dissolvers 120, 122 and into the flow path 70, which leads from the dissolver system 94 to a filter system 200 of the PCR PS feed preparation system 20. As discussed in detail below, the flow of the dissolved mixture 124 to the filter system 200 may be controlled using variable displacement pumps disposed downstream of the dissolvers 120, 122. However, the use of other control features, such as flow control valves, is also presently contemplated.

In accordance with present embodiments, the filter system 200 generally includes features for filtering the dissolved mixture 124 in a controlled manner that enables the removal of a substantial portion of non-styrenic materials (e.g., undissolved non-styrenic polymers and/or particulates) from the dissolved mixture 124. As noted above, increased filtration efficiency may be obtained when using the PCR PS 14 in flake or chip form as opposed to pellet form, though either form may be used in accordance with present embodiments. Indeed, the removal of such materials may enable a PCC styrenic resin produced from a mixture incorporating the PCR PS 14 to have improved properties (e.g., performance, processability, appearance) compared to a PCC styrenic resin produced from a mixture that is prepared using techniques that do not include the preparation techniques discussed herein (e.g., compounding).

Figure 4:
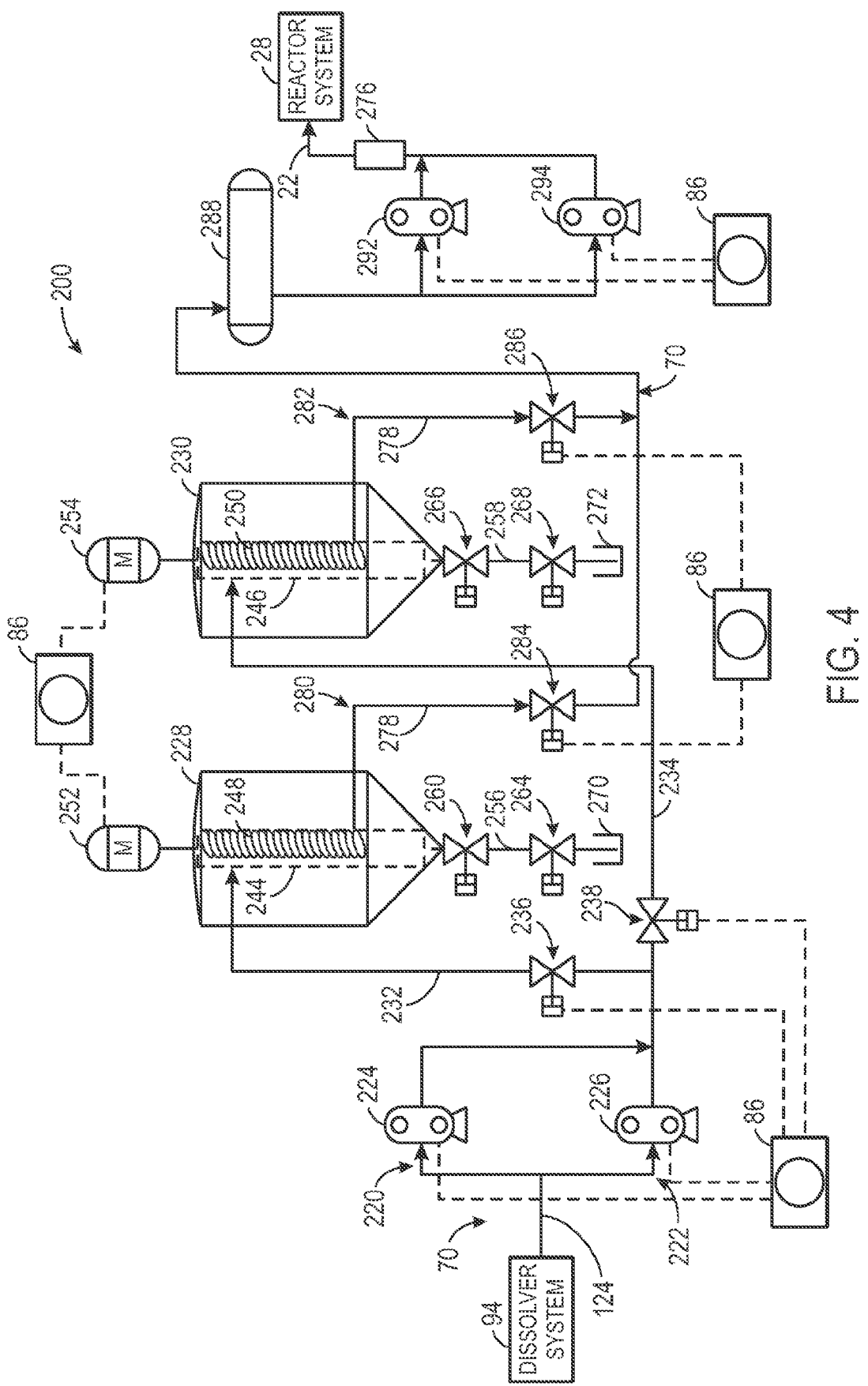
FIG. 4 is a diagrammatical illustration of an embodiment of a filter system of the PCR PS feed preparation system of FIG. 1, the filter system being configured to receive the dissolved mixture from the dissolver system of the PCR PS feed preparation system of FIG. 1, to filter the dissolved mixture to produce a filtered mixture, and to produce a PCR PS feed to a reactor system, in accordance with an aspect of the present disclosure.

The embodiment of the filter system 200 illustrated in FIG. 4 includes the flow path 70, which, in the filter system 200, is configured to flow the dissolved mixture 124 through various features configured to prepare the mixture for provision to the reactor system 28. In particular, the dissolved mixture 124 may be received into the filter system 200 of the PCR PS feed preparation system 20 along the flow path 70, which splits into third and fourth intermediate paths 220, 222. The third and fourth intermediate paths 220, 222 lead to first and second filter feed pumps 224, 226, which may be variable displacement pumps and which are on-line spares for one another. The flow rate of the dissolved mixture can be controlled (e.g., by an operator and/or the DCS 86) using the pumps 224, 226 such that appropriate flow rates for the dissolved mixture 124 provided to the first and second filters 228, 230 are obtained. Such flow rates may depend on the specifications of the filters, the capability of the filter feed pumps 224, 226, the length of conduits fluidly coupling the pumps 224, 226 to the filters 228, 230, or any combination thereof.

As illustrated, the third and fourth intermediate flow paths 220, 222 may re-converge into the flow path 70, and may diverge into fifth and sixth intermediate flow paths 232, 234, which lead to the first filter 228 and the second filter 230, respectively. However, it should be noted that in other embodiments, the third and fourth intermediate flow paths 220, 222 may not re-converge and, instead, may lead directly to the first and second filters 228, 230. First and second filter feed flow control valves 236, 238 may be disposed along the fifth and sixth intermediate flow paths 232, 234, respectively, to determine which of the first filter 228 or the second filter 230 will receive the flow of the dissolved mixture 124. In one embodiment, the DCS 86 may control the operation of the valves 236, 238.

The first and second filters 228, 230 include any filter suitable for removing targeted non-styrenic undissolved materials (e.g., non-GPPS and/or non-HIPS materials) from the dissolved mixture 124. For example, the first and second filters 228, 230 may include filter screens generally having a mesh size of between approximately 1 micron and 1 millimeter, such as between approximately 10 microns and 400 microns, for removing undissolved materials. In the illustrated embodiment, the first and second filters 228, 230 are self-cleaning filters having cylindrical screen meshes 244, 246, and augers 248, 250 disposed within the cylindrical screen meshes 244, 246, the augers 248, 250 being coupled to motors 252, 254. By way of non-limiting example, the first and second filters 228, 230 may be self-cleaning Eco Filters available from Russell Finex, Inc. of Pineville, N.C. As illustrated, in certain embodiments, the DCS 86 may control the operation of the motors 252, 254.

As depicted, the dissolved mixture 124 is provided internal to the cylindrical screen meshes 244, 246. All dissolved components of the dissolved mixture 124 pass through the cylindrical screen meshes 244, 246 while some or all of the undissolved materials do not. Instead, the undissolved particulates (e.g., undissolved resins) are carried by the augers 248, 250 to discharge lines 256, 258. In addition, the cylindrical screen meshes 228, 230 may be cleaned by the action of the augers 248, 250. A series of discharge valves 260, 264, 266, 268 may be disposed along the discharge lines 256, 258 to control the rate at which undissolved materials are discharged from the first and second filters 228, 230. First and second waste vessels 270, 272 may also be provided for collecting the undissolved non-styrenic materials for later treatment and disposal. While illustrated as including two waste vessels, it should be noted that, in certain embodiments, discharge lines 256, 258 may converge such that there is only one waste vessel.

As set forth above, the illustrated first and second filters 228, 230 include cylindrical screen meshes 244, 246. In a general sense, the cylindrical screen meshes 244, 246 are sized so as to remove undissolved solids (e.g., undissolved non-styrenic resins) while enabling a sufficient flow of the dissolved mixture 124 therethrough. Additionally, the sizes of the meshes 244, 246 may be the same or different. By way of non-limiting example, the cylindrical screen meshes 244, 246 have screen sizes between approximately 5 and 900 microns, such as between approximately 40 and 400 microns, between approximately 60 and 100 microns, or approximately 60 microns. While such sizes may be appropriate for the removal of most non-styrenic materials, trace amounts of other materials, such as finer particulates, may remain. Accordingly, as discussed in detail below, the filter system 200 may also include at least one additional filter, such as a bag filter 276 for removing additional undissolved particulates.

The first and second filters 228, 230, as illustrated, output the undissolved materials via discharge lines 256, 258, and also output a filtered mixture 278 via respective exit paths 280, 282. At this point, in certain embodiments, the filtered mixture 278 may be at least 95 weight percent styrenic materials (including polymer and monomer), with a significant portion of the non-styrenic materials being removed by cyclonic separation in the receiving system 60 (FIG. 2) and/or the first and second filters 228, 230. Indeed, the filtered mixture 278 may be between approximately 97 weight percent and 100 weight percent styrenic materials, such as between approximately 98 weight percent and 100 weight percent styrenic materials. The exit paths 280, 282 may include respective flow control valves 284, 286 for adjusting a flow of the filtered mixture 278 through the paths 280, 282. As illustrated, the DCS 86 may be communicatively coupled to the valves 284, 286 such that the flow control may be performed automatically.

The exit paths 280, 282 may re-converge into the flow path 70, which directs the filtered mixture 278 toward a surge tank 288 for storing the filtered mixture 278. First and second reactor feed pumps 292, 294, which may be variable displacement pumps, are disposed downstream of the surge tank 288 for motivating the filtered mixture 278 and the PCR PS feed 22 to the reactor system 28. As illustrated, the reactor feed pumps 292, 294 are on-line backups for one another, and may be controlled by the DCS 86 and/or an operator.

As noted above, the filtered mixture 278 may be filtered downstream of the surge tank 288 by one or more bag or cartridge filters 276 to generate the PCR PS feed 22. Thus, the filtered mixture 278 may be motivated along the flow path 70 by the reactor feed pumps 292, 294, and to the bag or cartridge filter 276. By way of non-limiting example, the bag or cartridge filter 276 may include one or more filter screens or meshes each having a screen or mesh size between approximately 1 micron and 800 microns, such as between approximately 10 and 200 microns. Such a screen or mesh size may be desirable to remove any remaining dust or particulates from the PCR PS feed 22 before provision to the reactor system 28.

In certain embodiments, other components of the feed 18 (FIG. 1), such as additional diluent, additional monomer, comonomers, HIPS feed, HIPS-producing feed, or the like, may be combined with the filtered mixture 278 downstream of the reactor feed pumps 292, 294 to generate the PCR PS feed 22. Therefore, in certain embodiments, the PCR PS feed 22 may consist essentially of PCR PS in MVA monomer, while in other embodiments the PCR PS feed 22 may include the PCR PS in MVA monomer in addition to diluents and/or other additives that affect the polymerization reaction performed within the reactor system 28 and/or the resulting PCC styrenic resin produced by the reactor system 28. As noted above, other in-system recycled materials 36 (FIG. 1) may be combined with the filtered mixture 278 from the effluent treatment system 34 (FIG. 1).

As discussed above with respect to FIG. 1, the PCR PS feed 22 may be provided either directly to the reactor system 28 or indirectly to the reactor system 28 via the feed system 24. In the embodiment illustrated in FIG. 4, the PCR PS feed 22 is provided directly to the reactor system 28, though in other embodiments the configuration in FIG. 4 may be used in conjunction with the feed system 24. Further, in certain embodiments, the feed system 24 may simply include a series of injection ports or other similar features disposed directly on a reactor of the reactor system 28 for introducing the reactor feed 26. Thus, in certain embodiments, a stream containing a synthetic rubber, such as polybutadiene, dissolved in MVA monomer may be provided directly to the reactor system 28.

III. Preparation of the Post-Consumer Recycle (PCR) Styrenic Resin

As set forth above, in addition to providing systems and methods for producing a high quality reactor feed including post-consumer (PC) polystyrene, the present disclosure also provides embodiments for producing a styrenic resin incorporating the PCR PS in a manner that enables the resin (a post-consumer recycle (PCR) resin) to have properties (e.g., performance, processability, appearance) suitable for use in the production of articles of manufacture. For example, it is now recognized that the production of a virgin styrenic resin in the presence of the PCR PS 14 enables the production of a substantially homogeneous PCC styrenic resin melt stream with improved chain length and enhanced chain entanglement between the PCR PS 14 and the virgin styrenic resin produced in-reactor. Thus, the properties of the virgin styrenic resin are better able to offset certain of the undesirable properties of the PCR PS 14 when compared to other incorporation methods, such as compounding. As discussed in detail below, such in-reactor produced resins may have better appearance, processability, and performance when compared to a resin produced by compounding the virgin material and the PCR PS 14. Indeed, it is also now recognized that the filtration of the PCR PS 14 discussed above produces a higher quality feed for the reactor system 28, which enables reduced heat history leading to improved chain entanglement, appearance, etc., that would otherwise not necessarily be obtained. For example, removal of non-styrenic components from the PCR PS 14, such as polypropylene, polyvinylchloride, and the like, reduces cosmetic imperfections and defects in appearance. The consistency of the PCC styrenic resin and its properties may also be improved.

Further, it should be noted that the use of self-cleaning filters as either or both of the first and second filters 228, 230 may be particularly advantageous. For example, in accordance with present embodiments, it has been found that self-cleaning filters as the first and/or second filters 228, 230 enable the system 10 to produce a higher-quality PCC styrenic resin compared to other configurations in which such filters are not used. While not wishing to be bound by theory, it is believed that the use of self-cleaning filters as either or both of the first and second filters 228, 230 may enable continuous operation of the reactor system 28 by providing a substantially continuous feed of the PCR PS feed 22. In providing the substantially continuous feed of the PCR PS feed 22, the reactor system 28 may enter into a steady state of operation after the reactor system 28 has been continuously operating for a predetermined amount of time (e.g., at least approximately 5 hours, such as between approximately 5 hours and 24 hours). In the steady state of operation, variability in the operation of the components of the reactor system 28 may be reduced, which is believed to produce PCC styrenic resins having better physical properties (e.g., extensional viscosity, MFR) compared to when the reactor system 28 is not allowed to reach a steady state. Indeed, it has been found that when filters other than self-cleaning filters are utilized, variation in the operation of the reactor system 28 occurs due to downtime of the filter system 200 resulting from repeated removal and replacement of filters (e.g., bag filters, screens, and the like). This, in turn, results in a reduction of the quality of the PCC styrenic resin (e.g., in the physical properties of the resin) as well as the reproducibility of the PCC styrenic resin. Furthermore, throughput and efficiency may be reduced as well. The self-cleaning filters therefore not only enable a substantially continuous operation of the reactor system 28 for an extended period of time (e.g. at least 1 day, such as between 1 day and 1 month, between 1 day and 1 week), but the self-cleaning filters also enable the production of PCC styrenic resins having improved properties.

In view of the foregoing, it should also be appreciated that the properties of the virgin styrenic resin produced within the reactor system 28 may significantly impact the overall properties of the PCC styrenic resin. For example, in a general sense, in accordance with present embodiments, producing a virgin resin having a higher molecular weight (as measured by weight-average molecular weight (Mw) and/or number-average molecular weight (Mn)), a greater number of relatively high molecular weight chains (as reflected by Z-average molecular weight (Mz) and/or Z+1-average molecular weight (Mz+1), a lower melt flow rate (MFR), or any combination thereof, may offset the relatively poor processability and/or performance of the PCR PS 14. Similarly, a relatively clear and colorless virgin styrenic resin (as measured by tristimulus values, haze, clarity) will offset, at least to some degree, the relatively yellowish and hazy appearance commonly associated with PCR PS.

Figure 5:
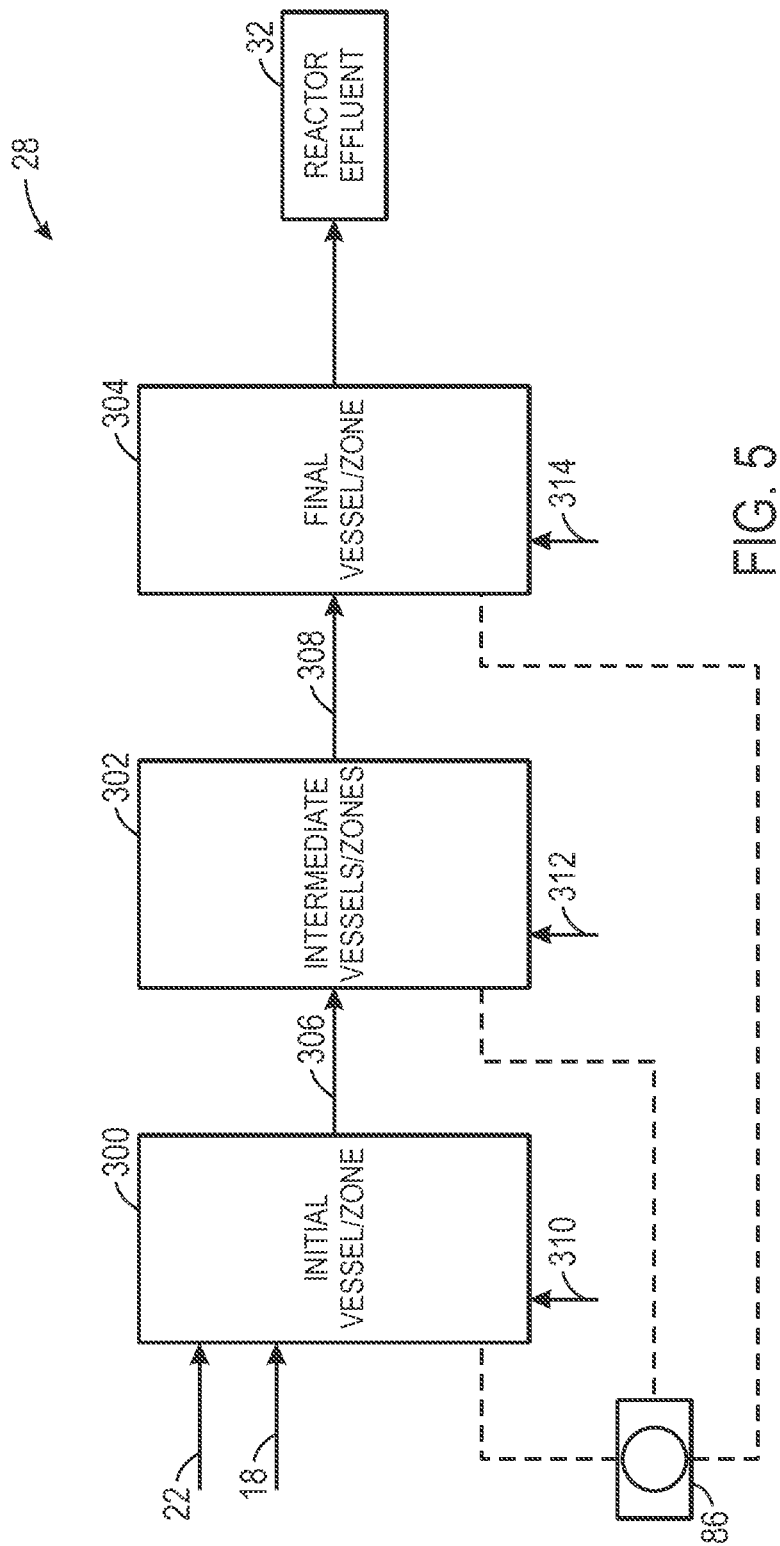
FIG. 5 is a block diagram of an embodiment of the reactor system of FIG. 1, the reactor system being configured to receive the PCR PS feed and/or the reactor feed from the PCR PS feed preparation system of FIG. 1, the feed system of FIG. 1, or both, to produce a post-consumer styrenic resin having virgin styrenic resin and PCR PS, in accordance with an aspect of the present disclosure.

One embodiment of the reactor system 28 that is configured to polymerize the MVA monomer 16 to produce the virgin styrenic resin in the presence of the PCR PS 14 is depicted schematically in FIG. 5. As noted above, generally, the reactor system 28 may include any number and type of reactors and zones capable of subjecting the MVA monomer 16 to polymerization conditions. The one or more reactors of the reactor system 28 may be disposed in parallel, in series, or any combination thereof. Further, the reactor system 28 may include one or more different types of reactors capable of independently subjecting the MVA monomer 16 to particular polymerization conditions. The reactors may transfer heat, perform axial and horizontal mixing, and so on, in the same or a different manner depending on the type of reactor and the desired properties of the virgin styrenic resin produced therein. By way of non-limiting example, the reactor system 28 may include one or more tower reactors, stirred tank reactors (including recirculated loop reactors and continuously stirred tank reactors), stratified reactors, axially segregated agitated reactors, or any combination thereof. Other types of polymerization reactors suitable for the production of a styrenic resin will be readily apparent to those of skill in the art and are within the scope of the present disclosure.

In the embodiment illustrated in FIG. 5, the reactor system 28 includes a plurality of vessels or zones, including an initial vessel or zone 300, which receives the PCR PS feed 22 and other feed 18, including diluents, plasticizers, initiator, chain transfer agents, and so on. The reactor system 28 also includes intermediate vessels or zones 302, and a final vessel or zone 304, which outputs the reactor effluent 32. It should be appreciated, however, that any number of reaction vessels (e.g., 1, 2, 3, or more) having any number of zones (e.g., 1, 2, 3, or more) may be suitable. Thus, in certain embodiments, the reactor system 28 may include one reactor having one reaction zone, such as in embodiments where the reactor is a continuous stirred tank reactor. As noted above, the vessels or zones may be separate reactor vessels (e.g., a series of stirred tanks), or may simply be zones within a particular type of reactor. Further, while reaction mixtures 306, 308 are illustrated as being transferred from the initial vessel or zone 300 to intermediate vessels or zones 302 and from the intermediate vessels or zones 302 to the final vessel or zone 304 in a horizontal direction, it should be noted that such a transfer may actually be occurring in a vertical direction, such as in embodiments where the vessels or zones 300, 302, 304 are a part of a stratified reactor or an agitated tower. Indeed, in such embodiments, the reactor may be a single vessel containing the vessels or zones 300, 302, 304. Further, it should be noted that the vessels or zones 300, 302, 304 are illustrated as separate entities to facilitate discussion, and that in such embodiments, the vessels or zones 300, 302, 304 may not be segregated by walls or any other physical protrusion but, rather, may be segregated based on reactor parameters set for a particular zone or area of the reactor.

In addition to the PCR PS feed 22 and the other feed 18 provided to the initial vessel or zone 300, certain feed components may be directly injected into any one or a combination of the vessels or zones 300, 302, 304 via respective injection ports 310, 312, 314. For example, diluent and/or initiators, as well as HIPS-producing feed and/or HIPS feed may be directly injected into the vessels or zones 300, 302, 304 via their respective injection ports 310, 312, 314. Further, the different injection ports 310, 312, 314 may not necessarily receive the same feed. In other words, while certain of the injection ports 310, 312, 314, such as the injection port 310 of the initial vessel 300 and the injection port(s) 312 of the intermediate vessels or zones 302, may receive diluent and/or initiator, the injection port 314 of the final vessel or zone 304 may receive other additives that may otherwise interfere with the polymerization process, such as antioxidants, colorants, or the like. The injection ports may be introduced throughout the process from pre-reactor vessel through solvent removal/recovery. In certain embodiments, any one or a combination of the vessels or zones 300, 302, 304 may produce and/or receive recycle feed (e.g., unreacted MVA monomer 16, diluent/solvent) either from the effluent treatment system 34 or from other vessels or zones.

The reaction parameters within each of the vessels or zones 300, 302, 304 may also be separately and independently controlled. For example, each of the vessels or zones 300, 302, 304 may include various features for providing or removing heat from the polymerization reaction contents contained therein, for agitating the contents, for motivating (e.g., pumping) the contents, or any combination thereof. Heating/cooling may be accomplished using heating/cooling jackets, resistive heating elements, heat transfer tubes configured to flow heating/cooling liquids, and the like. Agitation may be accomplished using pumps, impellers, agitator blades, and the like. Indeed, each of the vessels or zones 300, 302, 304 may be independently heated/cooled, agitated, and motivated.

The reaction parameters can be controlled and monitored as desired (e.g. by the DCS 86 or an operator). By way of non-limiting example, control set points include feed rates, feed times, agitation rates and times, heating/cooling rates and times, transfer times (e.g. between the vessels or zones 300, 302, 304), or any combination thereof. As generally noted above with respect to FIG. 1, the reaction parameters may be selected so as to obtain desired melt, physical, rheological, and/or mechanical properties of interest, such as melt flow rate (MFR), molecular weight (e.g. Mn, Mw, Mz, Mz+1), copolymer or comonomer content, tensile strength and modulus.

In accordance with present embodiments, the vessels or zones 300, 302, 304 polymerize the MVA monomer 16 according to a free-radical bulk or solution polymerization process in an atmosphere that is substantially free of oxygen. Such processes utilize a reaction mixture including at least the MVA monomer 16 and can include a free-radical peroxide and/or azo-based initiator. In certain embodiments, multifunctional initiators may be desirable for producing higher molecular weight styrenic resins. Suitable peroxide initiators include benzoyl peroxide, t-butyl 2-methylperbenzoate, di-t-butyl peroxide, di(2-ethylhexyl) peroxydicarbonate, t-amyl peroctoate, t-butyl peroxybenzoate, t-butyl peroxyacetate, t-butyl peroxyoctoate, dibenzoyl peroxide, dilauroyl peroxide, 1,1-bis(t-butylperoxy)cyclohexane, 1-3-bis t-butylperoxy-(3,3,5-trimethyl cyclohexane), di-cumyl peroxide, polyesther poly-t-butylperoxycarbonate, di-t-butyl diperoxyazelate, and the like. Suitable azo initiators include 2,2'-azobis(isobutyronitrile) (AIBN), 2,2'-azobis(2,4-dimethylvaleronitrile), 1,1'-azobis(cyclohexanebarbonitrile), and the like. Photochemical initiation techniques can be employed if desired.

The initiators may be employed in a range of concentrations dependent on a variety of factors including the specific initiators employed, the desired levels of polymerization and the conditions at which the mass polymerization is conducted. Specifically, initiators may be employed in amounts from 0 to 2000, preferably from 100 to 1500, parts by weight per million parts by weight of the MVA monomer 16.

In addition, the process may utilize a hydrocarbon solvent (e.g., if the polymerization is a solution free-radical polymerization). Acceptable solvents include normally liquid organic materials which form a solution with the MVA monomer 16 and the styrenic polymer prepared therefrom. Representative solvents include aromatic and substituted aromatic hydrocarbons such as benzene, ethylbenzene, toluene, xylene or the like; substituted or unsubstituted, straight or branched chain saturated aliphatics of 5 or more carbon atoms, such as heptane, hexane, octane or the like; alicyclic or substituted alicyclic hydrocarbons having 5 or 6 carbon atoms, such as cyclohexane; and the like. Particularly suitable solvents include substituted aromatics, with ethylbenzene, toluene, and xylene being most preferred. In general, the solvent is employed in amounts sufficient to improve the processability and heat transfer during polymerization. Such amounts will vary depending on the MVA monomer 16 and solvent employed, the process equipment and the desired degree of polymerization. If employed, the solvent is generally employed in an amount of up to about 35 weight percent, preferably from about 2 to about 25 weight percent, based on the total weight of the reaction mixture. It should be noted that at higher concentrations of PCR PS, the percent by weight solvent, based on the total weight of the reaction mixture, may generally be reduced.

The polymerization process conducted in the vessels or zones 300, 302, 304 may also include other materials such as co-polymers (e.g. synthetic rubbers such as polybutadiene, elastomers), plasticizers (e.g. mineral oil); flow promoters, lubricants, antioxidants (e.g., hindered phenolic antioxidant octadecyl 3,5-di(tert)-butyl-4-hydroxyhydrocinnamate), initiators, mold release agents (e.g. metal carboxylates or metal salts of fatty acids such as zinc stearate), color enhancers (e.g. 1-hydroxy-4-(methylphenyl)aminoanthraquinone) or polymerization aids such as chain transfer agents (e.g. alkyl mercaptans such as n-dodecyl mercaptan, terpenes such as terpinolene, alkyl and aryl halides, and alkyl aromatics). Other such additives that may be incorporated into the polymerization process for styrene resin production are also presently contemplated, are readily apparent to those of skill in the art, and are within the scope of the present disclosure. Indeed, any one or a combination of such components may be provided as a portion of the feed 18 provided to the initial vessel or zone 300 or via the injection ports 310, 312, 314 to vessels or zones 300, 302, 304.

In accordance with present embodiments, the conditions within the vessels or zones 300, 302, 304 may be selected so as to produce a desired molecular weight range for the virgin styrenic resin, which may be determined based upon a particular combination of residence time and production rate. The residence time may be determined based at least partially upon the rate at which the reaction mixture is motivated through the vessels or zones 300, 302, 304, while the reaction rate may be determined based at least partially on the temperature within each of the vessels or zones 300, 302, 304. Generally, the temperature set point of each of the vessels or zones 300, 302, 304 may be set to between approximately 60° C. and 190° C. Because thermal initiation, which occurs between approximately 120° C. and 180° C., is a generally undesirable process, it may be desirable to choose a temperature set point for each of the vessels or zones 300, 302, 304 appropriate to avoid such initiation. By way of non-limiting example, the temperature set points of the vessels or zones 300, 302, 304 may generally be between approximately 80° C. and 180° C. Indeed, a temperature of the reaction mixture may be incrementally increased as it moves through the vessel/zone or plurality of vessels or zones 300, 302, 304 from between approximately 25° C. and 90° C. to between approximately 135° C. and 180° C.

It should be noted that the temperature set points of the vessels or zones 300, 302, 304 may be the same, or may be different. In embodiments where the vessels or zones 300, 302, 304 are zones of a tower or stratified reactor, there may be a thermal gradient from the initial zone 300 to the final zone 304, with the initial zone 300 having a lower temperature set point compared to the final zone 304. For example, the temperature difference between immediately adjacent zones may be between approximately 1° C. and 10° C., such as between approximately 2° C. and 8° C. Such a configuration may be desirable to maintain a relatively constant reaction rate and heat-generation rate between the zones. Finally, the temperatures may be chosen so as to obtain a desired reaction rate suitable for producing styrenic polymer chains having a desired length. It should also be noted that, in certain embodiments, a preheater may be utilized upstream of the initial zone 300 (or the initial zone 300 may be used as a preheater) having a temperature set point sufficient to activate the initiator. In this way, chemical initiation occurs at the beginning stages of the overall polymerization process and dominates the overall process, even at temperatures at which thermal initiation may occur to some extent.

IV. The Post-Consumer Containing (PCC) Styrenic Resin

As discussed above with respect to FIG. 1, the reactor effluent 32 may be treated by the effluent treatment system 34 to remove volatiles (e.g. unreacted monomer, solvent) to isolate the polymer melt 38, which is a styrenic resin having both the PCR PS from the PCR PS feed 22 and the virgin styrenic resin produced in the reactor system 28 from the MVA monomer 16. The polymer melt 38 may also include a variety of additives to enhance the stability, appearance, and processability of the polymer melt 38, including colorants, antiblocking agents, fire retardants, antioxidants, mold release agents, and the like. Any suitable amount of these and other additives may be incorporated into the polymer melt 38, with the amounts being determined based upon the particular end use of the polymer melt 38, various regulatory standards (e.g., standards for children's toys, food contact, and/or fire resistance), and the particular physical and chemical properties of the styrenic resin itself. Indeed, such amounts will be readily apparent to those of skill in the pertinent field and are within the scope of the present disclosure.

The amount of PCR PS incorporated into the polymer melt 38 will be primarily determined based upon the amount of PCR PS 14 provided to the dissolver system 94 of FIG. 3, the amount of MVA monomer 16 provided to the dissolver system 94, and the amount of any additional MVA monomer 16 or other styrenic-resin producing components provided to the reactor system 28 of FIGS. 1 and 5. Thus, the amount of PCR PS in the polymer melt 38 may be determined by a simple mass balance calculation using the amount of PCR PS 14 initially provided the first and second dissolvers 120, 122 (FIG. 3) and the amount of PCR PS 14 remaining in the first and second dissolvers 120, 122 after the dissolved mixture 124 is provided to the filter system 200 (FIG. 4), which determines the actual concentration of PCR PS 14 in the dissolved mixture 124. By way of example, the mass balance may be calculated according to equations (1)-(5), which are provided below.

% PCR PS=PCR PS Feed/[Total Feed Rate−Recycle Out]  (1)

PCR PS Feed=PCR PS Solution Flow Rate×PCR Concentration in Dissolver  (2)

PCR Concentration in Dissolver=Weight of PCR PS Added/[Weight of MVA Monomer Added+Weight of PCR PS Added]  (3)

Total Feed=Feed of MVA Monomer+Feed of PCR PS Solution+Recycle Flow Rate+Additives Flow Rate  (4)

Recycle Out=Flow Rate of Recycle to Storage Tank  (5)

The concentration of the PCR PS 14 in the MVA monomer 16 may be adjusted based on the amount of any additional feed components used to produce the PCR PS feed 22 (FIG. 4). Using a known feed rate of the PCR PS feed 22 (or the reactor feed 26 having the PCR PS feed 22), a known amount of PCR PS is provided to the reactor 28. Accordingly, the concentration of PCR PS in the polymer melt 38 may be determined by simply dividing the amount of PCR PS provided to the reactor system 28 by the total weight of dry polymer melt 38 obtained after devolatilization and removal of any liquids.

Generally, the polymer melt 38 (i.e., PCC styrenic resin) may have between 1 weight percent and 50 weight percent PCR PS incorporated therein, such as between 1 weight percent and 40 weight percent PCR PS, or between 1 weight percent and 30 weight percent PCR PS. However, it will be appreciated that several factors may affect this concentration, including the ability to motivate the dissolved mixture 124 through the system 10 (FIG. 1) as the dissolved mixture 124 increases in viscosity with increasing PCR PS concentrations. Limitations of the system 10 may be determined primarily by system equipment limitations, such as viscosity limitations for pumps, impellers, mixers, agitators and similar equipment. In addition, the ultimate end use for the styrenic resin may determine the maximum level of PCR PS, which typically has relatively poor physical properties, which can be incorporated into the PCC styrenic resin while still maintaining properties that are suitable for the end use. For example, melt flow rate (MFR), which is related to the processability and toughness of the PCC styrenic resin (higher values meaning easier processability but reduced toughness and stability), may be increased and the extensional viscosity (EV) of the PCC styrenic resin, which is generally related to processability and performance, may generally be reduced, with increasing amounts of PCR PS. While generally any MFR is presently contemplated, in some embodiments, such an increase in MFR and decrease in EV is generally undesirable, as high MFR (e.g. above about 5 g/10 min per ASTM-D1238-10) and low EV (e.g. below about 240,000 Pascal-seconds at 172° C. and an extension rate of 10 sec$^{-1}$ and 0.3 seconds when measured on an extensional rheometer) may be associated with a generally low quality styrenic resin that will result in the production of a low quality article of manufacture.

Due at least in part to the PCR PS feed preparation system 20, which is configured to produce a high quality feed of PCR PS in the MVA monomer, as well as the relatively good physical properties of the virgin styrenic resin produced within the reactor system 28, present embodiments provide for the production of a PCC styrenic resin having between approximately 1 weight percent and 50 weight percent PCR PS, between 1 weight percent and 40 weight percent PCR PS, or between 1 weight percent and 30 weight percent PCR PS, and that is suitable for the production of articles of manufacture. However, the use of PCR PS in any amount is presently contemplated in accordance with present embodiments. By way of non-limiting example, the PCC styrenic resin produced in accordance with present embodiments may have between approximately 10 weight percent and 40 weight percent PCR PS, between approximately 15 weight percent and 35 weight percent PCR PS, between approximately 20 weight percent and 30 weight percent PCR PS, or approximately 25 weight percent PCR PS.

In still further embodiments, the PCC styrenic resin produced in accordance with present embodiments may have less than approximately 10 weight percent PCR PS and greater than approximately 1 weight percent PCR PS, such as between approximately 1 weight percent and 10 weight percent PCR PS, between approximately 1 weight percent and 9 weight percent PCR PS, between approximately 2 weight percent and 8 weight percent PCR PS, between approximately 3 weight percent and 7 weight percent PCR PS, between approximately 4 weight percent and 6 weight percent PCR PS, or approximately 5 weight percent PCR PS. In still further embodiments, the PCC styrenic resin produced in accordance with present embodiments may have greater than approximately 10 weight percent PCR PS and less than 20 weight percent PCR PS, such as between approximately 11 weight percent and 20 weight percent PCR PS, between approximately 12 weight percent and 18 weight percent PCR PS, between approximately 13 weight percent and 17 weight percent PCR PS, between approximately 14 weight percent and 16 weight percent PCR PS, or approximately 15 weight percent PCR PS.

With respect to the MFR of the PCC styrenic resin, as may be appreciated, the MFR generally increases with increasing PCR PS levels due to the poor (i.e., relatively high) MFR inherent to the PCR PS. In accordance with the present disclosure, all MFR values are quoted as values obtained in accordance with ASTM D-1238-10 using a 5 kg load measured at 200° C. Generally, the PCC styrenic resin will have a MFR of approximately 4 or less g/10 min, such as between approximately 1.2 g/10 min and 4.0 g/10 min. In accordance with present embodiments, a PCC styrenic resin having about 10 weight percent or less PCR PS may have a MFR of less than about 1.7 g/10 min. For example, in embodiments where the PCC styrenic resin has between approximately 1 weight percent and 9 weight percent PCR PS (e.g., between approximately 2 weight percent and 8 weight percent PCR PS, or between approximately 4 weight percent and 6 weight percent, such as approximately 5 weight percent PCR PS), the resin may have a MFR of less than 2.0 g/10 min, such as between approximately 1.2 g/10 min and 2.0 g/10 min, between approximately 1.2 g/10 min and 1.8 g/10 min, between approximately 1.3 g/10 min and 1.7 g/10 min, or between approximately 1.4 g/10 min and 1.6 g/10 min. In certain embodiments, the PCC styrenic resin may have between 20 and 30 weight percent PCR PS and may have a MFR of between approximately 1.6 g/10 min and 3.6 g/10 min. In another embodiment, the PCC styrenic resin may have between approximately 20 and 30 weight percent PCR PS and a MFR of approximately 2.5 g/10 min or less.

As another example, in embodiments where the PCC styrenic resin has between approximately 10 weight percent and 20 weight percent PCR PS, the resin may have a MFR of 2.5 g/10 min or less, such as between approximately 1.3 g/10 min and 2.0 g/10 min. In embodiments where the PCC styrenic resin has between approximately 20 weight percent and 26 weight percent PCR PS, the resin may have a MFR of 2.3 g/10 min or less, such as between approximately 1.6 g/10 min and 2.2 g/10 min or, in certain embodiments, 2.0 g/10 min or less. In further embodiments, the PCC styrenic resin may have between approximately 24 weight percent and 26 weight percent PCC styrenic resin with a MFR of between approximately 2.3 g/10 min and 1.8 g/10 min, or approximately 2.2 g/10 min or less, 2.1 g/10 min or less, 2.0 g/10 min or less, 1.9 g/10 min or less, or 1.8 g/10 min or less, depending on the quality of the PCR PS and the virgin styrenic resin incorporated into the PCC styrenic resin. Indeed, in certain embodiments, the PCC styrenic resin, at a concentration of approximately 25 weight percent PCR PS, may have a MFR of between approximately 1.8 g/10 min and 2.0 g/10 min.

The Z+1 molecular weight (Mz+1) of the PCC styrenic resin is one indicator of the processability and the performance (e.g., toughness, flexibility) of the resin. Mz+1 may be particularly indicative of these properties due to its emphasis on longer molecular weight chains, which are believed to increase strength and enable better orientation between polymer chains compared to resins having shorter polymer chains. Indeed, it is believed that the low Mz+1 of typical PCR PS resins leads to high MFR values, brittleness, lower strength, poor sidewall distribution in thermoformed products, and the like. Generally, higher Mz+1 values are indicative of a relatively higher population of long polymeric chains. The Mz+1 value of a resin may be obtained using size exclusion chromatography (SEC) techniques such as gel permeation chromatography (GPC). By way of non-limiting example, the Mz+1 value may be measured according to ASTM D-5296-11, including the methods described in U.S. Pat. Nos. 4,585,825, 5,191,040, and 6,545,090, all of which are incorporated by reference herein in their entirety for all purposes. All Mz+1 values quoted herein are atomic mass units (a.m.u.). As discussed herein, the Z+1 average molecular weight is generally defined according to equation (6) below:

$$M_{Z+1} = \frac{\sum n_i M_i^4}{\sum n_i M_i^3} \quad (6)$$

where $M_i$ is the molecular weight of a given chain and $n_i$ is the number of chains having the particular molecular weight In accordance with present embodiments, the PCC styrenic resin having at least approximately 20 weight percent PCR PS may have an Mz+1 of at least approximately 665,000, at least approximately 670,000, at least approximately 680,000, at least approximately 685,000, at least approximately 690,000, at least approximately 700,000, or at least approximately 710,000 or more. Indeed, in certain embodiments, the Mz+1 of the PCC styrenic resin may be between approximately 670,000 and 750,000. For example, in embodiments where the PCC styrenic resin has between 20 weight percent and 30 weight percent PCR PS, the Mz+1 may be between approximately 685,000 and 740,000, such as between approximately 690,000 and 720,000, or between approximately 700,000 and 710,000. In one embodiment, the Mz+1 may be greater than approximately 695,000.

As a further example, in embodiments where the PCC styrenic resin has between 1 weight percent and 9 weight percent PCR PS, such as between approximately 2 weight percent and 8 weight percent PCR PS, or between approximately 4 weight percent and 6 weight percent PCR PS, such as approximately 5 weight percent PCR PS, the PCC styrenic resin may have an Mz+1 of at least approximately 680,000, at least approximately 690,000, at least approximately 700,000, at least approximately 710,000, or at least approximately 720,000. For example, in embodiments where the PCC styrenic resin has between 2 weight percent and 8 weight percent PCR PS, the Mz+1 may be between approximately 680,000 and 750,000, such as between approximately 700,000 and 750,000. For example, the PCC styrenic resin may have between 3 weight percent and 7 weight percent PCR PS, or between approximately 4 weight percent and 6 weight percent PCR PS, and may have an Mz+1 of between approximately 700,000 and 740,000, between or between approximately 710,000 and 730,000. In some embodiments, the PCC styrenic resin has between approximately 3 weight percent and 7 weight percent PCR PS, such as between approximately 4 weight percent and 6 weight percent PCR PS, and has an Mz+1 of between approximately 700,000 and 730,000.

The extensional viscosity (EV) of the PCC styrenic resin may provide a similar indication as to the processability and performance of the resin, such as its ability to provide adequate sidewall distribution in thermoformed articles, the use of the resin in regrind processes, and generally good orientation in sheet extrusion processes. The EV of the PCC styrenic resin may be measured using an extensional rheometer. The values quoted herein are intended to denote the values obtained on such a rheometer having an extensional viscosity fixture using an extension rate of 10 sec$^{-1}$ at 172° C., with the value being recorded at 0.3 seconds.

As noted above, higher EV values may be desirable for the PCC styrenic resin. In accordance with present embodiments, the EV of the PCC styrenic resin may be at least approximately 250,000 Pascal-seconds (Pa-sec), such as at least approximately 270,000 Pa-sec, at least approximately 280,000 Pa-sec, at least approximately 290,000 Pa-sec, or at least approximately 300,000 Pa-sec. By way of non-limiting example, the PCC styrenic resin may have between approximately 20 weight percent and 30 weight percent PCR PS and an EV of at least approximately 285,000, Pa-sec, such as between approximately 285,000 Pa-sec and 320,000 Pa-sec, between approximately 290,000 Pa-sec and 315,000 Pa-sec, or between approximately 295,000 Pa-sec and 310,000 Pa-sec. In one embodiment, the PCC styrenic resin may have at least approximately 20 weight percent PCR PS and an EV of at least approximately 290,000 Pa-sec. For example, the PCC styrenic resin may have approximately 25 weight percent PCR PS and an EV of at least approximately 293,000 Pa-sec.

In other embodiments, the PCC styrenic resin may have between approximately 1 weight percent and 9 weight percent PCR PS and an EV of at least approximately 300,000 Pa-sec. For example, in embodiments where the PCC styrenic resin has between approximately 2 weight percent and 8 weight percent PCR PS, such as between approximately 3 weight percent and 7 weight percent, or between approximately 4 weight percent and 6 weight percent PCR PS, such as approximately 5 weight percent PCR PS, the EV of the PCC styrenic resin may be between approximately 300,000 Pa-sec and 350,000 Pa-sec, between approximately 310,000 Pa-sec and 340,000 Pa-sec, or between approximately 320,000 Pa-sec and 330,000 Pa-sec. In one embodiment, the PCC styrenic resin may have between approximately 3 weight percent and 7 weight percent PCR PS and an EV of at least approximately 320,000 Pa-sec. For example, the PCC styrenic resin may have between approximately 4 weight percent and 6 weight percent PCR PS (e.g., approximately 5 weight percent PCR PS) and an EV of between approximately 320,000 Pa-sec and 340,000 Pa-sec.

EXAMPLES

The following actual examples are set forth to provide those of ordinary skill in the art with a detailed description of how the techniques discussed herein may be implemented, and are not intended to limit the scope of the present disclosure.

Unless stated otherwise, the styrenic resins discussed herein were produced according to a free-radical solution polymerization process using an organic peroxide initiator, styrene monomer, various sources of PCR PS, and ethylbenzene solvent in a stratified reactor. The stratified reactor included nine polymerization zones capable of being placed at individual temperature set points. The individual set points formed a temperature gradient from approximately 108° C. to approximately 141° C. Agitation rates were controlled between 1 and 21 rotations per minute (rpm), with three separate agitators rotating at different rates. The resins were collected by multi-stage flashing and devolatilization at various times throughout the polymerization process, as is evident from the tables set forth below. An example set of parameters is provided in Table 1 below.

TABLE 1

| Reaction Profile | | |
|---|---|---|
| Parameter | Units | Value |
| Total feed rate | lb/h | 9000 |
| Ethylbenzene in feed | % | 10.5 |
| Recycle to zones | lb/h EB | 110 |
| Initiator | ppm | 275 |
| Zn stearate | % | 0.06 |
| Color tint | ppm | 725 |
| preheater | ° C. | 85 |
| Z1 | ° C. | 108 |
| Z2 | ° C. | 114 |
| Z3 | ° C. | 116 |
| Z4 | ° C. | 118 |
| Z5 | ° C. | 120 |
| Z6 | ° C. | 123 |
| Z7 | ° C. | 129 |
| Z8 | ° C. | 133 |
| Z9 | ° C. | 141 |
| 1st RPM | rpm | 21 |
| 2nd RPM | rpm | 17 |
| 3rd RPM | rpm | 1 |
| 1st Flash Temperature | ° C. | 164 |
| 1$^{st}$ Flash Pressure | mm Hg | 325 |
| 2$^{nd}$ Flash Temperature | ° C. | 242 |
| 2nd Flash Pressure | mm Hg | 11 |

TABLE 1-continued

The following test methods were employed to determine certain of the physical and analytical properties of the PCC styrenic resins and other resins discussed herein. Melt flow rate (MFR) was measured using a Tinius Olson Extrusion Plastometer Melt Flow Measurement Apparatus, Model MP993, according to the test procedure ASTM D-1238-10 at 200° C. using a 5 kilogram (kg) load. Molecular weight calculations for the resins, including weight average molecular weight, Mw, number average molecular weight, Mn, Z-average molecular weight, Mz, and Z+1 average molecular weight, Mz+1, were determined by the gel permeation chromatographic techniques similar to those described by ASTM test method D-5296-11 (polystyrene standard). Extensional viscosity measurements were conducted using an ARES G-2® rheometer with an extensional viscosity fixture. Compression molded samples were prepared with a thickness of 0.7 mm, a width of 10 mm, and a length of 18 mm. The compression molded samples were tested at a temperature of 172° C. The extension rate was 10 sec$^{-1}$. Extensional viscosity data was recorded at 0.3 seconds.

The PCC styrenic resins discussed with respect to Examples 1-3 were all produced using NEXTLIFE RECYCLING SUSTAINABLE POLYSTYRENE® as the source of PCR PS, which was obtained from NextLife Recycling, LLC of Boca Raton, Fla. Characteristic specifications of this resin in pellet and flake form are provided in Table 2 below.

TABLE 2

| Example PCR PS Properties | | | |
|---|---|---|---|
| Parameter | Units | Natural Pellets | White Flake |
| Melt Flow Rate (MFR), g/10 min | g/10 min | 7.39 | 6.97 |
| Mn | a.m.u. | 75,600 | 76,400 |
| Mw | a.m.u. | 218,100 | 219,400 |
| Mz | a.m.u. | 388,900 | 385,800 |
| Polydispersity | | 2.89 | 2.87 |

Example 1

A styrenic resin having, as an overall average, 8.7 weight percent of PCR PS was produced according to the polymerization process described above. A filtered PCR PS feed was produced by first mixing flakes of NEXTLIFE RECYCLING SUSTAINABLE POLYSTYRENE® PCR PS with styrene monomer to produce a slurry, which was provided to a dissolver, where the PCR PS was allowed to dissolve in the styrene monomer. The resulting solution was then strained to remove gross contaminants and subsequently passed through a feed filter having a 200 micron screen size to remove undissolved fines. The resulting stream was provided to the polymerization reactor to produce the PCC styrenic resin having properties as set forth in Table 3 below. The various samples were obtained at different time points during the polymerization process. Regarding certain of the measurements, "b*" is a color measurement denoting the relationship between the yellowness and blueness of the resin, with positive values tending toward yellow hues and negative values tending toward blue hues. Yellowness Index (YI) is a measurement relating to how yellow the resin appears. Optical Control Systems' (OCS) Pellet Scanning System model PS-25c measures off-color particles such as black specks.

TABLE 3

Example 1 PCC styrenic resin Properties

| | sample no. | | | | | | |
|---|---|---|---|---|---|---|---|
| Parameter | 1 | 2 | 3 | 4 | 5 | 6 | 7 |
| % PC PS | 3% | 6% | 9% | 10% | 10% | 10% | 10% |
| MFR (g/10 min) | 1.45 | 1.55 | 1.67 | 1.65 | 1.67 | 1.50 | — |
| Mw/1000 (a.m.u.) | — | 293.0 | 292.0 | 288.2 | 285.0 | 292.0 | 295.3 |
| Mn/1000 (a.m.u.) | — | 119.0 | 118.0 | 116.1 | 114.0 | 119.0 | 120.5 |
| Mw/Mn | | 2.45 | 2.46 | 2.48 | 2.50 | 2.44 | 2.45 |
| b* | −1.16 | 3.40 | 6.17 | 8.02 | 8.68 | 9.32 | — |
| YI | −3.49 | 7.20 | 13.33 | 19.24 | 19.24 | 20.49 | — |
| OCS (mm$^2$/kg) | 2.54 | 1.98 | 2.85 | 5.05 | 7.54 | 1.14 | — |

Example 2

A styrenic resin having, as an overall average, 23.4 weight percent PCR PS was produced according to the polymerization process described above, except for a modification to the process utilized to produce the feed to the reactor. The PCR PS was added, in flake form, via a hopper and star valve at approximately 8000 lb/hr (for a total of 53,000 lb of PCR PS), directly to a dissolver pre-loaded with styrene (120,000 lb) being agitated. The balance of styrene monomer was added to bring the contents to approximately 25% PCR solution. Agitation and dissolution was carried out for about 6.5 hours. The resulting dissolved solution was fed to strainers to remove gross contamination, then through a set of four feed filters (50-400 micron) to remove undissolved fines. The strainer included two 30-inch strainers in parallel, but only one used at a time. The filter bags used in the strainers were nylon monofilament Rosedale high-capacity bag filters with dimensions of 7 1/16" diameter and 32" length with 4.4 sq. ft of filtration surface area and a 4.6 gallon capacity obtained from Rosedale Products, Inc. of Ann Arbor, Mich. The pore size of the filter was 800 microns nominal (part number NMO800P2SS-H and NMU800P2SS-H). The main feed filters were a group of four Parker Hannifin filters of size: 20 1/16" ID×36 9/16" L (S/N: 33187-19045) obtained from Parker Hannifin Corp. of Cleveland, Ohio.

The resulting filtered feed was provided to the reactor system, where the styrene was polymerized to produce a substantially continuous stream of PCR PS product. As noted above, a series of samples obtained at different times during the overall polymerization process were tested to produce the values set forth in Table 4 below. "Granulation" denotes granulation size measured in grams per 100 pellets. Certain of the data may be rounded to facilitate presentation.

TABLE 4

Example 2 PCC styrenic resin Properties

| | sample no. | | | | | | | | | | |
|---|---|---|---|---|---|---|---|---|---|---|---|
| Parameter | 1 | 2 | 3 | 4 | 5 | 6 | 7 | 8 | 9 | 10 | 11 |
| % PC PS | 21.1% | 21.1% | 20.6% | 19.6% | 15.0% | 23.3% | 22.1% | 23.3% | 24.9% | 24.3% | 25.2% |
| Feed Rate | 10000 | 10000 | 9000 | 9000 | 8000 | 7500 | 7500 | 7500 | 7000 | 7000 | 7000 |
| MFR (g/10 min) | 1.6 | 1.7 | 1.94 | 1.94 | 1.77 | 1.75 | 1.91 | 1.83 | 1.78 | 2.11 | 2.3 |
| Mw/1000 (a.m.u.) | 294 | — | 288 | 292 | 290 | 292 | 287 | 289 | 291 | 284 | 276 |
| Mn/1000 (a.m.u.) | 122 | — | 118 | 119 | 121 | 121 | 119 | 118 | 120 | 118 | 114 |
| b | 10.5 | 11.9 | 13.4 | 13.4 | 10 | 12.01 | 13.7 | 13.9 | 14.2 | 13.65 | 14.47 |
| YI | 23 | 25.6 | 29.4 | 29.2 | 21.4 | 26.0 | 29.8 | 30.5 | 31.2 | 30.3 | 33.4 |
| Zn St (wt %) | 0.08 | — | 0.09 | 0.09 | 0.082 | 0.086 | 0.089 | 0.09 | 0.09 | 0.09 | 0.11 |
| OCS (mm$^2$/kg) | 2.65 | — | 0.27 | 0.73 | 1.37 | 0.76 | 1 | 2.39 | 3.19 | 4.79 | 3.07 |
| Granulation (g/100 pellets) | 2.64 | — | 2.5 | 2.5 | 2.5 | 2.5 | 2.5 | 2.5 | 2.5 | 2.43 | 2.5 |

As can be seen from Table 4, the styrenic resin produced in this example contained between approximately 20 weight percent PCR PS and 25 weight percent PCR PS, with a MFR varying between 1.6 g/10 min and 2.3 g/10 min. The resin also incorporates, on average, about 0.09 weight percent zinc stearate (Zn St) as measured by X-ray fluorescence.

Example 3

A styrenic resin having, as an overall average, 24.4 weight percent of PCR PS was produced according to the polymerization process described above, except that the PCR PS was used in pellet form and all of the filter bags utilized for filtration of the feed were 400 micron filters. In addition, 100 lb of IRGANOX® 1076 hindered phenolic antioxidant, available from BASF SE of Ludwigshafen, Germany, was added to 60,000 lb of the dissolved mixture of PCR PS in styrene monomer to ascertain the affect of the antioxidant on the resulting resin. As can be appreciated from the tabulated data, the addition of antioxidant pre-reaction can reduce Mw and PDI, indicating that it may hinder the formation of higher molecular weight polystyrene chains. The properties resulting from the polymerization reaction are provided in Table 5 below. In samples 8 and 9 (denoted by the asterisk), the feed included the antioxidant. As a result of this test, and prior research, it was determined that the anti-oxidant should be added after polymerization.

a compounded resin produced by compounding virgin polystyrene resin with flakes of the PCR PS resin in a weight ratio of 75:25 virgin polystyrene to PCR PS, and a compounded resin produced by compounding virgin polystyrene resin with pellets of the PCR PS resin in a weight ratio of 75:25 virgin polystyrene to PCR PS. The virgin styrenic resin used was STYRON® 685D polystyrene, which is commercially available from Americas Styrenics LLC of the Woodlands, Tex.

The compounded resins were produced by compounding in a HaakeBuchler Rheocord System 40 with model 23-50-

TABLE 5

Example 3 PCC styrenic resin Properties

| | sample no. | | | | | | | | |
|---|---|---|---|---|---|---|---|---|---|
| Parameter | 1 | 2 | 3 | 4 | 5 | 6 | 7 | 8* | 9* |
| % PC PS | 18.8% | 21.0% | 24.7% | 24.5% | 24.7% | 24.6% | 24.4% | 24.8% | 24.2% |
| Feed Rate | 8000 | 9000 | 9000 | 9000 | 9000 | 9000 | 9000 | 9000 | 9000 |
| MFR (g/10 min) | 1.97 | 2.4 | 2.1 | 1.94 | 1.80 | 2.0 | 2.2 | 2.67 | 2.53 |
| Mw/1000 (a.m.u.) | 285 | 280 | 283 | 285 | 283 | 282 | 279 | 264 | 267 |
| Mn/1000 (a.m.u.) | 118 | 117 | 117 | 117 | 116 | 115 | 116 | 117 | 117 |
| PDI | 2.41 | 2.39 | 2.42 | 2.44 | 2.43 | 2.45 | 2.41 | 2.26 | 2.28 |
| a* | 0.3 | 2.10 | 2.99 | 2.3 | 2.4 | 2.99 | 3.2 | 3.34 | 3.3 |
| b* | 15.2 | 19.4 | 20.7 | 19.5 | 19.9 | 20.6 | 20.7 | 21.4 | 21.2 |
| YI | 35 | 46.5 | 51.56 | 47.4 | 48.1 | 50.8 | 51.6 | 53.4 | 52.3 |
| Zn St ppm | 700 | 800 | 900 | 900 | 900 | 800 | 900 | 900 | 900 |
| OCS (mm$^2$/kg) | — | 14.66 | — | 0.41 | — | — | — | — | — |

As can be appreciated from Table 5, the PCC styrenic resin produced according to this example contained between approximately 18 weight percent and 25 weight percent PCR PS, with a MFR of between approximately 2.0 g/10 min and 2.4 g/10 min.

Comparison of in-Reactor Produced PCC Styrenic Resin with Compounded Resin

As set forth above, it is recognized that PCC styrenic resins produced according to the in-reactor method discussed herein generally have better overall properties (e.g., as measured by MFR, molecular weight, i.e. Mw and Mz+1, and EV) than resins produced by compounding a virgin resin with the PCR PS resin in a similar ratio. For example, the in-reactor produced materials will generally have a lower MFR, a higher EV, and a higher Mz+1, even after a number of passes through an extruder. The compared resins set forth below include an in-reactor produced resin having 25 weight percent PCR PS, 000 twin screw extruder attached. The resins were mixed in four zones (zones 1-4) at 160 rpm, with the temperature of zones 1-4 being 180° C., 190° C., 200° C., and 210° C., respectively.

The in-reactor produced PCC styrenic resin used for the comparison was obtained from a portion of the materials produced in the polymerization process set forth in Example 2. Properties of these resins are provided below in Tables 6-8. "L*," "a*," and "b*" are Tristimulus color measurements based on CIE (Comission Internationale de l'Eclairage or International Comission on Lighting) "L*,a*,b*" scale developed in 1976. "L*" measures the lightness of the object (with 0=black, 100=white) and "a*" measures the red/green hue (red being positive values and green represented by negative values).

TABLE 6

In-Reactor 25% PCR PS

| | Sample | | | | | |
|---|---|---|---|---|---|---|
| Parameter | PCC Styrenic Resin | Pass 1 | Pass 3 | Pass 5 | Pass 7 | Units |
| MFR | 2.21 | 2.48 | 3.03 | 3.36 | 3.93 | g/10 min. |
| Mn | 113,400 | 111,400 | 108,500 | 104,400 | 101,400 | a.m.u. |
| Mw | 274,700 | 268,500 | 257,900 | 247,300 | 240,600 | a.m.u. |
| Mz | 471,000 | 457,000 | 435,900 | 416,600 | 403,800 | a.m.u. |
| PDI | 2.42 | 2.41 | 2.38 | 2.37 | 2.37 | |
| Mz + 1 | 690,000 | 665,900 | 631,100 | 602,600 | 582,800 | a.m.u. |
| EV | 292,906 | 273,412 | 245,166 | 235,481 | 217,289 | Pa-sec |
| a* | −1.34 | −1.49 | −1.75 | −1.91 | −2.09 | |
| b* | 14.16 | 14.81 | 16.06 | 17.26 | 18.66 | |
| YID | 27.2 | 28.1 | 30.1 | 32.0 | 34.3 | |

TABLE 7

75% Virgin STYRON ® 685D/25% PCR PS Flake

| Parameter | Initial Compounding | Pass 1 | Pass 3 | Pass 5 | Pass 7 | Units |
|---|---|---|---|---|---|---|
| MFR | 2.83 | 3.00 | 3.47 | 3.74 | 4.26 | g/10 min. |
| Mn | 114,000 | 109,400 | 105,500 | 101,200 | 100,600 | a.m.u. |
| Mw | 277,500 | 270,300 | 263,700 | 253,000 | 246,700 | a.m.u. |
| Mz | 463,700 | 452,300 | 440,700 | 420,000 | 407,900 | a.m.u. |
| Polydispersity | 2.43 | 2.47 | 2.50 | 2.50 | 2.45 | |
| Mz + 1 | 664,900 | 647,700 | 630,300 | 597,000 | 578,600 | a.m.u. |
| EV | 259,881 | 240,090 | 222,132 | 217,356 | 201,270 | Pa-sec |
| L* | 76.26 | 76.15 | 75.93 | 75.59 | 75.25 | |
| a* | −1.91 | −1.79 | −1.97 | −1.84 | −2.01 | |
| b* | 11.99 | 13.00 | 14.30 | 15.16 | 16.94 | |
| YID | 24.7 | 26.8 | 29.3 | 31.2 | 34.6 | |

TABLE 8

75% Virgin STYRON ® 685D/25% PCR PS Pellets

| Parameter | Initial Compounding | Pass 1 | Pass 3 | Pass 5 | Pass 7 | Units |
|---|---|---|---|---|---|---|
| MFR | 2.85 | 3.12 | 3.52 | 3.94 | 4.30 | g/10 min. |
| Mn | 108,900 | 109,400 | 106,400 | 101,200 | 100,400 | a.m.u. |
| Mw | 272,700 | 269,000 | 259,200 | 249,500 | 243,300 | a.m.u. |
| Mz | 458,400 | 450,600 | 431,700 | 414,100 | 402,100 | a.m.u. |
| Polydispersity | 2.50 | 2.46 | 2.44 | 2.47 | 2.42 | |
| Mz + 1 | 658,400 | 645,700 | 615,800 | 589,100 | 570,700 | a.m.u. |
| EV | 250,455 | 242,657 | 225,295 | 217,727 | 197,070 | Pa-sec |
| L* | 76.46 | 76.30 | 76.10 | 75.94 | 75.75 | |
| a* | −0.82 | −0.93 | −1.18 | −1.39 | −1.44 | |
| b* | 12.02 | 13.22 | 15.37 | 17.77 | 19.11 | |
| YID | 25.7 | 28.1 | 32.1 | 36.5 | 39.1 | |

As can be seen in Tables 6-8 above, in addition to the properties of the resins post-production (labeled as "PCC styrenic resin" and "initial compounding"), their respective properties are also listed after several passes through an extruder. Indeed, the data suggests that in-reactor produced resins have, generally, a higher population of high molecular weight chains (as reflected by higher Mz+1 values), higher EV values, and lower MFR values when compared to resins produced by compounding. Therefore, the in-reactor produced resins will generally perform better than compounded resins in applications where good sidewall distribution, orientation, and chain entanglement are desired.

The data also suggests that the in-reactor produced resins may better maintain their properties upon processing compared to the compounded resins. Indeed, as can be seen when comparing the Mz+1, MFR, and EV across the multiple passes through the extruder, the in-reactor produced resin is superior in these measures throughout the seven passes. Indeed, PCC styrenic resins produced in accordance with present embodiments may not only have properties suitable for the production of various articles of manufacture, but may also advantageously enable enhanced properties in a subsequently produced PCC styrenic resin. In other words, the PCC styrenic resin may eventually serve as a source of PCR PS and, in doing so, may provide enhanced properties to a subsequently produced or "second generation" PCC styrenic resin produced therefrom when compared to a PCC styrenic resin produced by compounding.

Example 4

A styrenic resin having, as an overall average, approximately 5 weight percent of PCR PS was produced according to the polymerization process described above, except that the PCR PS is different than as described above, and the reaction profile was adjusted. The reaction profile is set forth in Table 9 below, and example properties of the PCR PS are provided in Table 10 below. It should be noted that the reaction profile set forth in Table 9 represents an increase in production rate of the reactor system, as demonstrated by an increase in the temperature in certain of the zones of the reactor and the feed rate into the reactor.

TABLE 9

Reaction Profile

| Parameter | Units | Value |
|---|---|---|
| Total feed rate | lb/h | 10000 |
| Ethylbenzene in feed | % | 6.2 |
| Recycle to zones | lb/h EB | 140 |
| Initiator | ppm | 310 |
| Zn stearate | % | 0.07 |
| Color tint | ppm | 425 |
| preheater | °C. | 85 |
| Z1 | °C. | 112 |
| Z2 | °C. | 114 |
| Z3 | °C. | 117 |

TABLE 9-continued

Reaction Profile

| Parameter | Units | Value |
|---|---|---|
| Z4 | °C. | 122 |
| Z5 | °C. | 125 |
| Z6 | °C. | 129 |
| Z7 | °C. | 130 |
| Z8 | °C. | 131 |
| Z9 | °C. | 132 |
| 1st RPM | rpm | 21 |
| 2nd RPM | rpm | 14 |
| 3rd RPM | rpm | 1 |
| 1st Flash Temperature | °C. | 185 |
| 1$^{st}$ Flash Pressure | mm Hg | 410 |
| 2$^{nd}$ Flash Temperature | °C. | 250 |
| 2nd Flash Pressure | mm Hg | 11 |

Provided in Table 10 below are certain properties of the PCC styrenic resin having approximately 5% by weight PCR PS produced as an in-reactor resin, as well as comparative data listing the properties for a PCC styrenic resin having approximately 5% by weight PCR PS produced via compounding. Data corresponding to the materials used to produce the resins, specifically the PCR PS, is also provided. In Table 10, the data is rounded to the nearest hundred. The virgin material used to produce the compounded resin was STYRON® 685D polystyrene.

TABLE 10

In-Reactor 5% PCC Styrenic Resin and
Compounded 5% PCC Styrenic Resin

| Parameter | In-Reactor PCC Styrenic Resin | Compounded PCC Styrenic Resin | PCR PS | Units |
|---|---|---|---|---|
| Unconditioned MFR | 1.55 | 2.07 | 7.43 | g/10 min. |
| Conditioned MFR | 1.47 | 1.97 | 7.31 | g/10 min. |
| Mn | 130,100 | 117,500 | 92,400 | a.m.u. |
| Mw | 299,800 | 289,900 | 216,500 | a.m.u. |
| PDI | 2.31 | 2.47 | 2.34 | |
| Mz | 492,780 | 479,700 | 369,400 | a.m.u. |
| Mz + 1 | 703,000 | 687,000 | 535,300 | a.m.u. |
| EV | 328,578 | 282,154 | 127,938 | Pa-sec |

As shown in the data above, the PCC styrenic resin produced according to present embodiments (in-reactor) has better overall properties compared to the compounded resin. Accordingly, the present techniques provide PCC styrenic resins having improved propertie s that are realized even at relatively low loadings of recycled material. In other words, the properties of the PCC styrenic resins produced using the in-reactor techniques disclosed herein are superior to the properties obtained via compounding techniques, even when relatively small amounts of recycled styrenic resins are incorporated into the styrenic resins produced as a final product. It should be noted that the process used to produce the in-reactor PCC styrenic resin of Example 4 also incorporated the use of self-cleaning filters in preparing the PCR PS feed provided to the reactor.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A styrenic resin comprising between approximately 1 weight percent and 9 weight percent post-consumer recycle polystyrene (PCR PS), wherein the styrenic resin has a melt flow rate (MFR) of less than approximately 2.0 g/10 min per ASTM D-1238-10 and an Mz+1 of at least approximately 700,000.

2. The styrenic resin of claim 1, wherein the styrenic resin has a MFR of between approximately 1.2 g/10 min and 1.9 g/10 min per ASTM D-1238-10.

3. The styrenic resin of claim 1, wherein the styrenic resin comprises between approximately 2 and 8 weight percent PCR PS and has a MFR of between approximately 1.3 g/10 min and approximately 1.7 g/10 min per ASTM D-1238-10.

4. The styrenic resin of claim 1, wherein the styrenic resin comprises between approximately 4 and 6 weight percent PCR PS and has a MFR of between approximately 1.4 g/10 min and approximately 1.6 g/10 min per ASTM D-1238-10.

5. The styrenic resin of claim 1, wherein the styrenic resin has between approximately 2 and 8 weight percent PCR PS and an Mz+1 of between approximately 700,000 and 750,000.

6. The styrenic resin of claim 1, wherein the styrenic resin has an extensional viscosity of at least 300,000 Pascal-seconds (Pa-sec) when measured on an extensional rheometer at 172° C. at an extension rate of 10 sec$^{-1}$ and a measurement recording time at 0.3 seconds.

7. The styrenic resin of claim 1, wherein the styrenic resin has an extensional viscosity of between approximately 300,000 Pa-sec and approximately 350,000 Pa-sec when measured on an extensional rheometer at 172° C. and an extension rate of 10 sec$^{-1}$ and a measurement recording time at 0.3 seconds.

8. The styrenic resin of claim 1, wherein the styrenic resin has between approximately 4 and 6 weight percent PCR PS, has an MFR of between approximately 1.4 and 1.6 g/10 min per ASTM D-1238-10, has an Mz+1 of between approximately 700,000 and 730,000, and an extensional viscosity of between approximately 320,000 and 340,000 Pa-sec when measured on an extensional rheometer at 172° C. at an extension rate of 10 sec$^{-1}$ and a measurement recording time at 0.3 seconds.

9. The styrenic resin of claim 1, wherein the styrenic resin is formed by a process comprising:
providing the PCR PS and monovinylarene monomer to a dissolver;
mixing the PCR PS and monovinylarene monomer within the dissolver to dissolve the PCR PS in the monovinylarene monomer so as to produce a first mixture;
providing the first mixture to a filter system comprising a self-cleaning filter to remove polymeric contaminants from the first mixture to produce a filtered mixture;
producing a reaction mixture comprising the filtered mixture; and
subjecting the reaction mixture to free-radical solution polymerization conditions to produce the styrenic resin.

10. An article of manufacture produced using a styrenic resin comprising between approximately 1 weight percent and 9 weight percent post-consumer recycle polystyrene (PCR PS), wherein the styrenic resin has a melt flow rate (MFR) of less than approximately 2.0 g/10 min per ASTM D-1238-10 and an Mz+1 of at least approximately 700,000.

11. The article of manufacture of claim 10, wherein the styrenic resin has between approximately 4 and 6 weight percent PCR PS, has an MFR of between approximately 1.4 and 1.6 g/10 min per ASTM D-1238-10, has an Mz+1 of between approximately 700,000 and 730,000, and an extensional viscosity of between approximately 320,000 and 340,000 Pa-sec when measured on an extensional rheometer at 172° C. at an extension rate of 10 sec$^{-1}$ and a measurement recording time at 0.3 seconds.

12. A method of producing a styrenic resin having post-consumer recycle polystyrene (PCR PS), comprising:
providing PCR PS and monovinylarene monomer to a dissolver;
mixing the PCR PS and the monovinylarene monomer within the dissolver to at least partially dissolve the PCR PS in the monovinylarene monomer in order to produce a first mixture;
providing the first mixture to a filter system comprising a self-cleaning filter to remove polymeric contaminants from the first mixture to produce a filtered mixture;
producing a reaction mixture comprising the filtered mixture; and
subjecting the reaction mixture to free-radical solution polymerization conditions to produce the styrenic resin having the PCR PS.

13. The method of claim 12, wherein the PCR PS and the monovinylarene monomer are provided to the dissolver in an amount such that the styrenic resin has between approximately 1 weight percent and 30 weight percent PCR PS.

14. The method of claim 12, wherein the styrenic resin comprises between approximately 1 weight percent and 9 weight percent post-consumer recycle polystyrene (PCR PS), and has a melt flow rate (MFR) of less than approximately 2.0 g/10 min per ASTM D-1238-10 and an Mz+1 of at least approximately 700,000.

15. The method of claim 14, wherein the styrenic resin has a MFR of between approximately 1.2 g/10 min and 1.9 g/10 min per ASTM D-1238-10.

16. The method of claim 14, wherein the styrenic resin has between approximately 4 and 6 weight percent PCR PS, has an MFR of between approximately 1.4 and 1.6 g/10 min per ASTM D-1238-10, has an Mz+1 of between approximately 700,000 and 730,000, and an extensional viscosity of between approximately 320,000 and 340,000 Pa-sec when measured on an extensional rheometer at 172° C. at an extension rate of 10 sec$^{-1}$ and a measurement recording time at 0.3 seconds.

17. The method of claim 12, wherein the PCR PS and the monovinylarene monomer are provided to the dissolver in an amount such that the styrenic resin has between approximately 20 weight percent and 30 weight percent PCR PS.

18. The method of claim 12, wherein providing the PCR polystyrene and the monovinylarene monomer to the dissolver comprises providing the PCR polystyrene to the dissolver as a solid and the monovinylarene monomer as a liquid, and wherein the mixing of the PCR polystyrene and the monovinylarene monomer in the dissolver is performed in an atmosphere substantially free of oxygen.

19. The method of claim 12, comprising removing metal particulates from a flow comprising the PCR polystyrene using a magnetic separator disposed upstream of the dissolver.

20. The method of claim 12, wherein producing the reaction mixture comprising the filtered mixture comprises providing a free-radical initiator, such that subjecting the reaction mixture to free-radical solution polymerization conditions comprises subjecting the reaction mixture to a chemically initiated free-radical polymerization.

* * * * *